United States Patent [19]
Kuznetsov

[11] Patent Number: 5,904,101
[45] Date of Patent: May 18, 1999

[54] AUXILIARY PROPULSION FOR MAGNETICALLY LEVITATED VEHICLE

[75] Inventor: Stephen B. Kuznetsov, Pittsburgh, Pa.

[73] Assignee: Power Superconductor Applications Co., Inc.

[21] Appl. No.: 08/845,008

[22] Filed: Apr. 22, 1997

[51] Int. Cl.⁶ .................................................. B60L 13/00
[52] U.S. Cl. ..................... 104/281; 104/282; 104/130.02
[58] Field of Search ................. 104/130.01, 130.02, 104/130.03, 281, 282, 283, 284, 286, 290, 292, 293, 294; 310/12, 13, 14

[56] References Cited

U.S. PATENT DOCUMENTS

| | | | |
|---|---|---|---|
| 3,780,668 | 12/1973 | Schwärzler et al. | |
| 3,828,686 | 8/1974 | Steenbeck et al. | 104/281 |
| 3,847,088 | 11/1974 | Karch | |
| 3,854,412 | 12/1974 | Dull | 104/281 |
| 3,994,236 | 11/1976 | Dull et al. | 104/130.1 |
| 4,299,173 | 11/1981 | Arima et al. | |
| 4,641,586 | 2/1987 | Miller et al. | 104/284 |
| 4,646,651 | 3/1987 | Yamamura et al. | |
| 4,729,323 | 3/1988 | Morishita et al. | 104/284 |
| 4,732,087 | 3/1988 | Morishita et al. | 104/130.1 |
| 4,979,445 | 12/1990 | Lanzara | 104/281 |
| 5,433,149 | 7/1995 | Kuznetsov | |
| 5,517,924 | 5/1996 | He et al. | 104/130.02 |
| 5,628,252 | 5/1997 | Kuznetsov | 104/284 |
| 5,655,458 | 8/1997 | Powell et al. | 104/281 |
| 5,666,883 | 9/1997 | Kuznetsov | 104/286 |

FOREIGN PATENT DOCUMENTS

| | | | |
|---|---|---|---|
| 2610538 | 9/1977 | Germany | 104/281 |
| 63-69402 | 3/1988 | Japan | 104/281 |
| 4-31165 | 2/1992 | Japan | 104/282 |
| 1476766 | 4/1993 | Russian Federation | 104/281 |

*Primary Examiner*—Mark T. Le
*Attorney, Agent, or Firm*—Clifford A. Poff

[57] ABSTRACT

A transportation system for levitated propulsion of a vehicle relative to a guideway having first sections for linear vehicle travel and second sections for turning movements of the vehicle is disclosed. The system includes AC-excited magnets for low-speed levitated travel in pivot turns, guideway switching areas, and curving sections of guideway including superelevated structure. The system includes guideway mounted primary electrical members in pivot turns and guideway switching areas. In switching areas vehicle steering is provided by null flux loops located on the guideway structure. In the curving sections of guideway, there is a dovetail trough containing secondary electrical members that interact with deployable primary electrical members on the vehicle which are independently positioned and powered for propelling the vehicle along the curving sections.

32 Claims, 25 Drawing Sheets

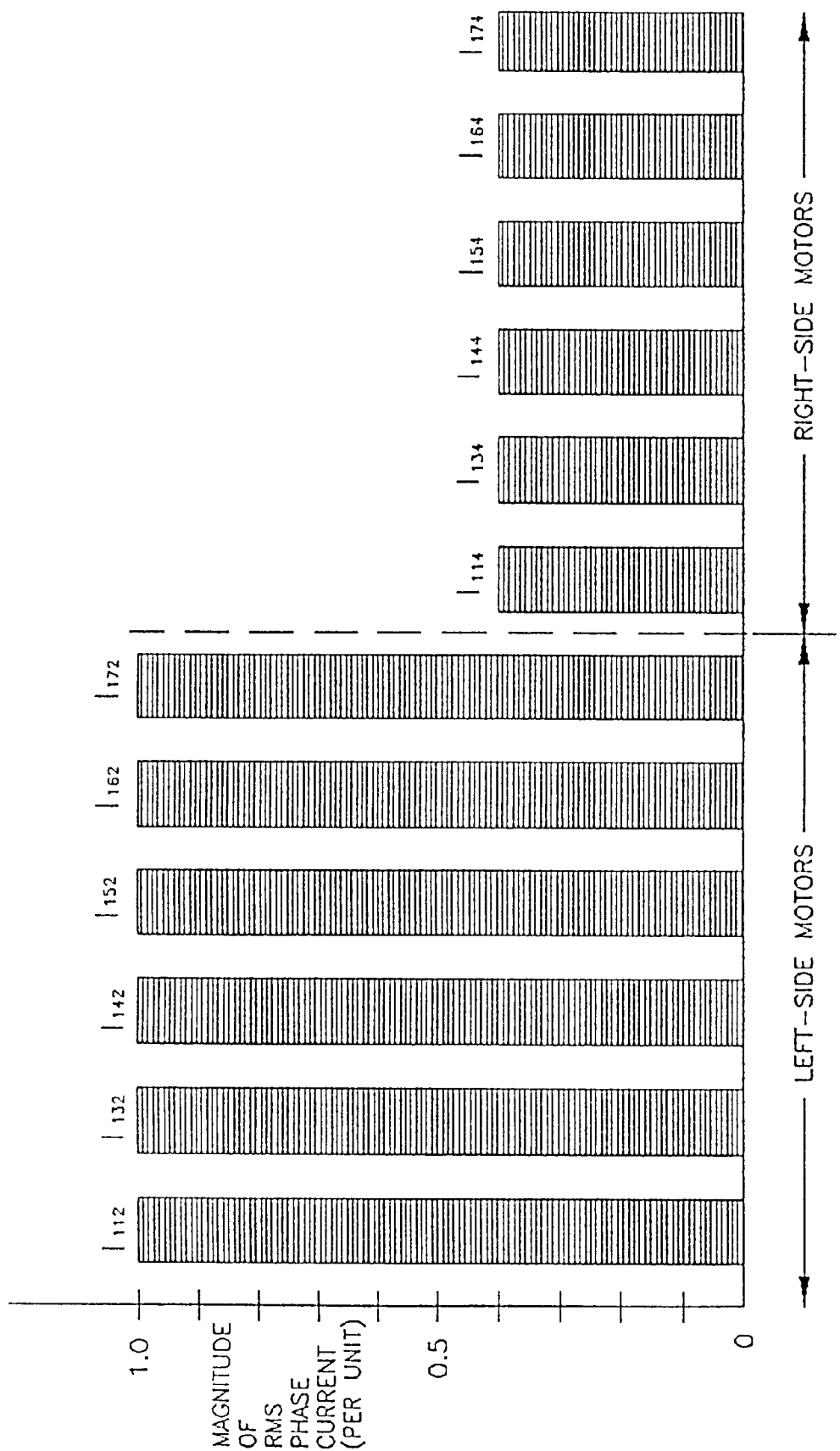

AUXILIARY PROPULSION FOR MAGNETICALLY LEVITATED VEHICLE

BACKGROUND OF THE INVENTION

1. Field of the Invention

The present invention relates generally to propulsion for a magnetically levitated vehicle, and more particularly to an electrodynamically levitated vehicle for providing propulsion and guidance in curvilinear sections of a vehicle guideway.

2. Description of the Prior Art

It is known in the art to provide for magnetically levitating a transportation vehicle through the use of alternating current excitation of superconducting magnets, as is described in my U.S. Pat. No. 5,666,883, issued Sep. 16, 1997. The use of alternating current as the means of excitation for the levitating magnets gives the ability to levitate a transportation vehicle under zero speed conditions and initiate advancement under speed control along a guideway while magnetically levitated thereby eliminating the need for rolling vehicle support for low speeds as is required with direct current excitation of superconducting magnets on a transportation vehicle. A magnetically levitated vehicle of this type offers unique capabilities for an inner city and urban transportation system because of vehicle levitation at relatively low speed, for example, up to 60 mph. The course of travel by the vehicle will necessarily include guideway constructed to conform to the terrain. Alternative courses of travel such as the use of turn out switching, embanking for high speed turns, and when desired, the ability to approach the traffic intersection and execute a right or left hand turn, as well as a pivot turn.

It is also known in the art to utilize a transverse component of force generated by an electromagnet as the means of propulsion for such a levitated vehicle. However, the guideway structure for such a vehicle will often include sections which require non-linear travel by the levitated vehicle resulting in removal of, or increased spacing between, the guideway sidewalls. This will impair the operability of propulsion components which operate in conjunction with guideway sidewall mounted components. Therefore, the vehicle will require an auxiliary source of propulsion in such sections of guideway structure requiring non-linear travel by the vehicle.

Accordingly, it is an object of the present invention to provide an auxiliary form of propulsion to supplement the main source of propulsion for a magnetically levitated vehicle in sections of guideway structure which require non-linear travel by the vehicle.

It is a further object of the present invention to provide a magnetically levitated vehicle having dynamoelectric machines used for combined propulsion and guidance to give lateral stability to the vehicle.

It is a further object of the present invention to provide a magnetically levitated vehicle having dynamoelectric machines used to provide high lateral stability and offer yaw stability including instances when the vehicle must negotiate compound curves.

It is a further object of the present invention to provide a magnetically levitated vehicle having dynamoelectric machines used for combined propulsion and lateral guidance for the vehicle when negotiating compound curves to dampen pitch and heave motions of the vehicle as well as stabilize the vehicle against roll, yaw, heave and pitch conditions.

It is a further object of the present invention to provide a magnetically levitated vehicle having dynamoelectric machines constructed and arranged for controlled positioning on the vehicle to compensate for asymmetrical airgaps or misalignment with respect to guideway structure.

It is a further object of the present invention to provide a magnetically levitated vehicle having a magnetic structure to allow levitation and guidance in close proximity without adverse flux and magnetic force interactions.

It is a further object of the present invention to provide a magnetically levitated vehicle with deployable and retractable magnetic components of dynamoelectric machines for accommodating vehicle travel while negotiating curvilinear paths of travel, turning movements including turn outs, and turnarounds.

It is a further object of the present invention to provide a magnetically levitated vehicle equipped with dynamoelectric machines to execute the combination of electrodynamic propulsion and guidance along super elevated curved guideways.

SUMMARY OF THE INVENTION

According to the present invention there is provided a transportation system for levitated propulsion of a vehicle relative to a guideway having first sections for linear vehicle travel and second sections for turning movements of the vehicle, the system including dynamoelectric machines operative in response to alternating current excitation to generate fields of magnetic flux for electrodynamically levitating and guiding the vehicle along the first and second sections of the guideway and for electrodynamic propulsion of the vehicle along the first sections of the guideway; and auxiliary dynamoelectric machines operative in response to alternating current to generate fields of magnetic flux for electrodynamic propulsion of the vehicle along the second sections of the guideway.

According to the present invention there is further provided a transportation system for levitated propulsion of a vehicle relative to a guideway having first sections for linear vehicle travel and second sections for turning movements of the vehicle, the system includes dynamoelectric machines at each corner of the vehicle responsive to alternating current excitation to generate fields of magnetic flux for electrodynamically levitating, propelling and guiding the vehicle along the first and second sections of the guideway, the electrodynamic machines at each corner comprising a plurality of AC excited electromagnets laterally offset with respect to adjacent ones of the plurality of electromagnets and independently excited by the same frequency of alternating current, each of the plurality of electromagnets at a corner of the vehicle operating at a predetermined phase difference with respect to adjacent electromagnets such that the magnets provide a propulsive force to the vehicle for turning movements in the second sections in addition to levitating and guiding.

BRIEF DESCRIPTION OF THE DRAWINGS

FIG. 13A is an illustration of the relative RMS-currents on the auxiliary motors of the vehicle of FIG. 9 which would tend to restore lateral positioning of the vehicle after side translation from external loading, such as wind forces;

DETAILED DESCRIPTION OF THE PREFERRED EMBODIMENTS

Figure 1:
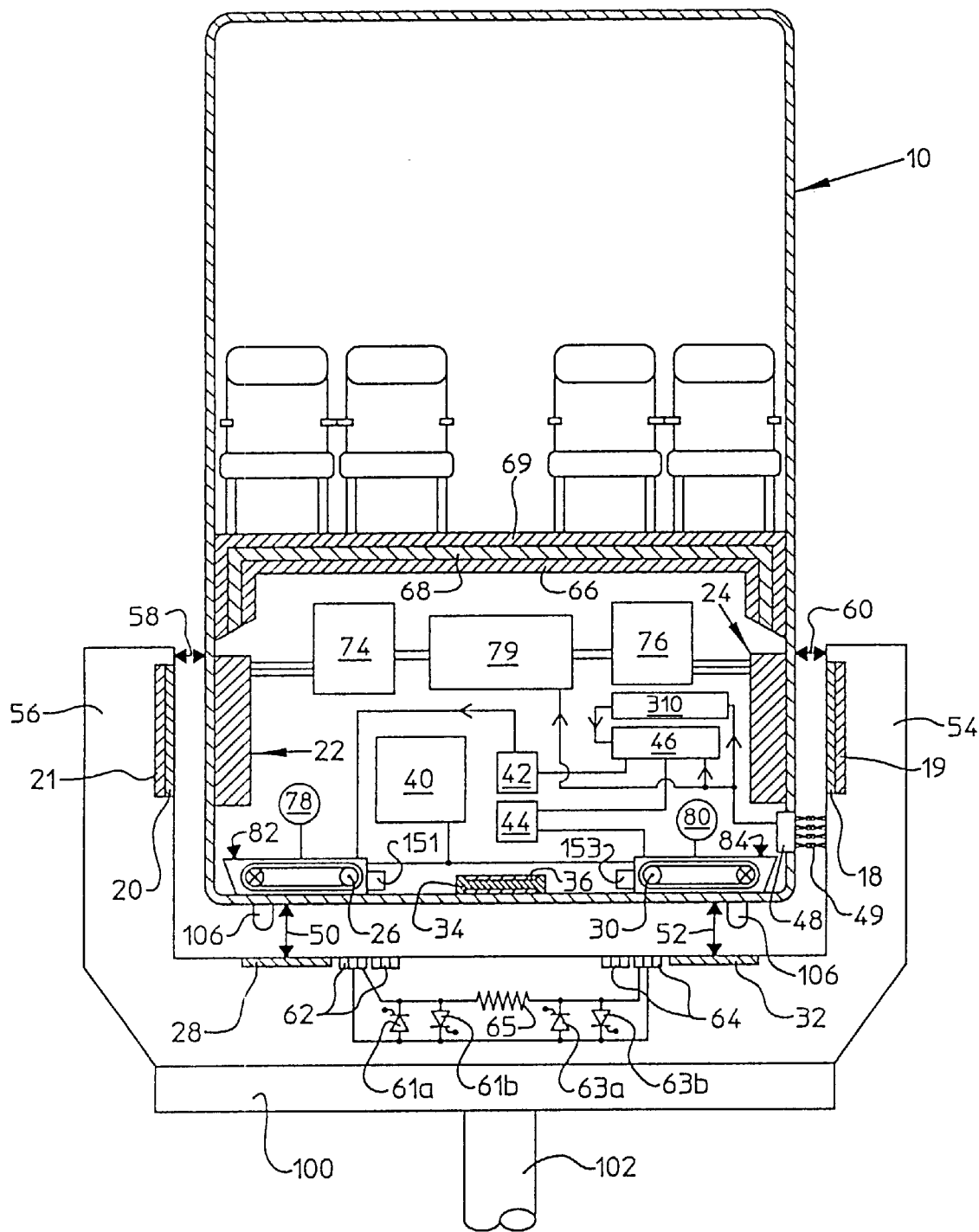
FIG. 1 is an elevational view in section of a first embodiment of a magnetically levitated vehicle, and the associated guideway structure, according to the present invention.
Figure 2:
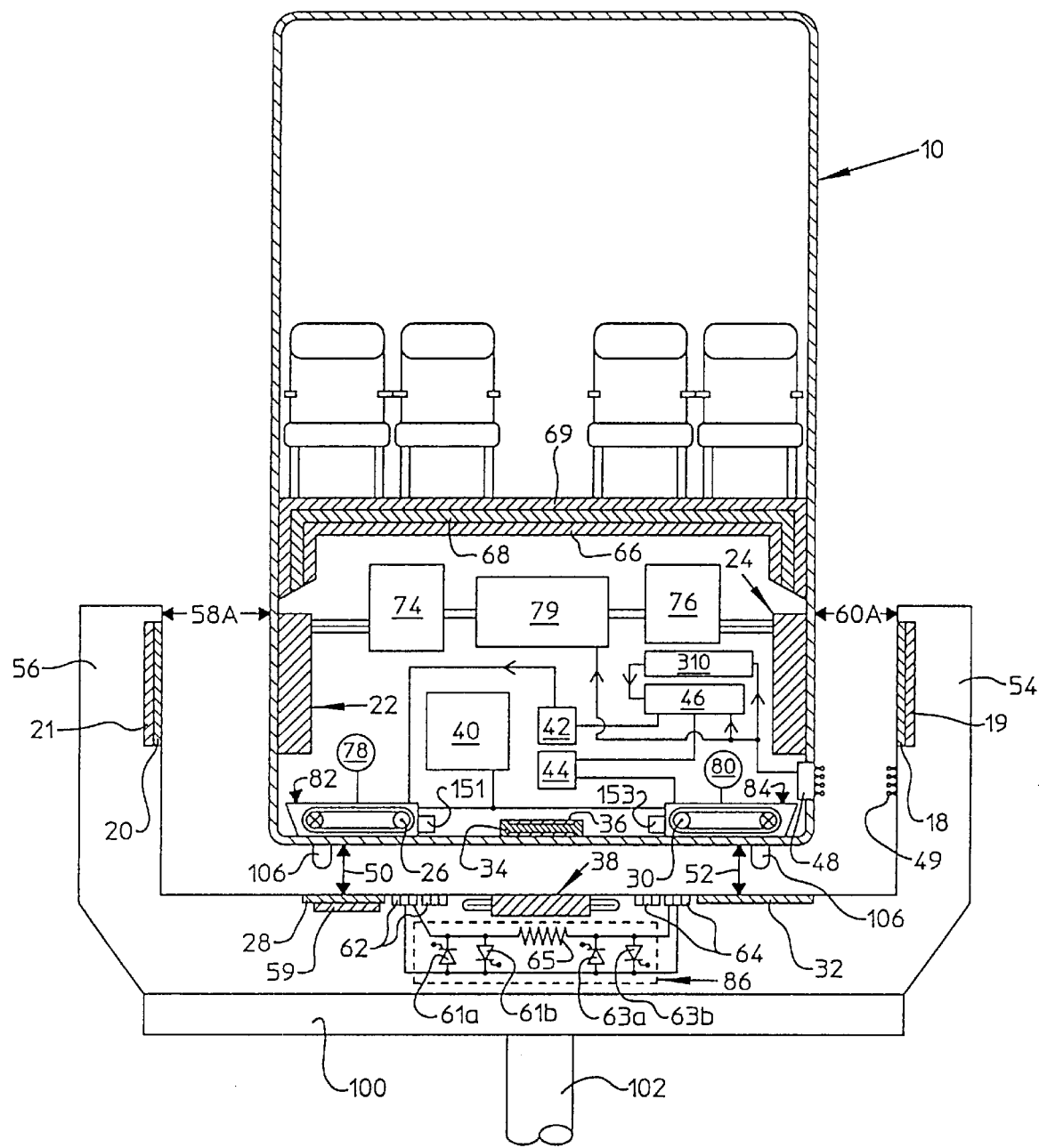
FIG. 2 is an elevational view in section of the vehicle of FIG. 1 entering a switching area of the guideway structure.
Figure 3:
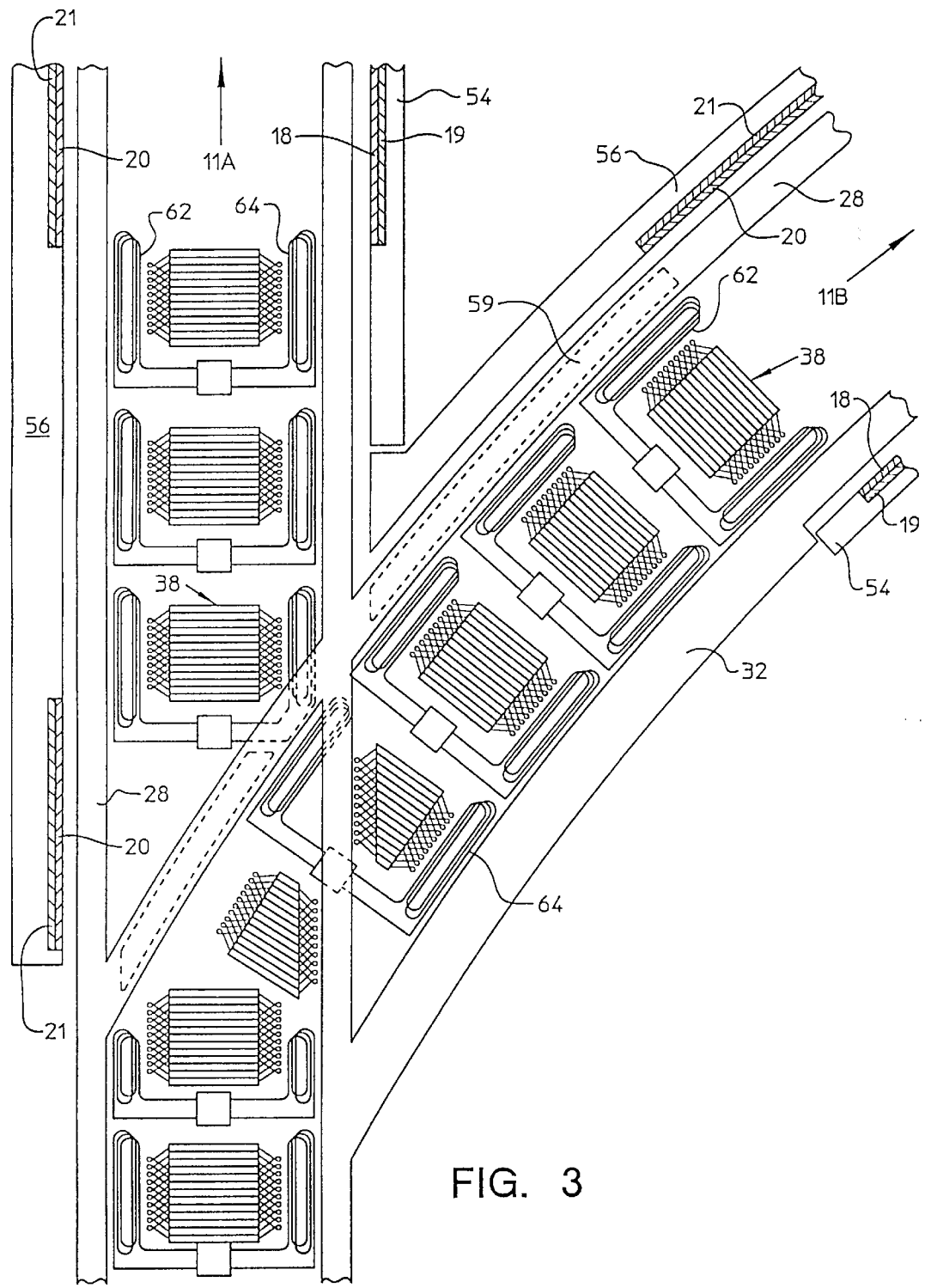
FIG. 3 is a plan view of a guideway switching area of guideway structure for the vehicle of FIGS. 1 and 2.

A first embodiment of the invention, shown in FIGS. 1–3, provides electromagnetic steering for switching the course of travel of an electrodynamically levitated vehicle 10 along one of two or more selectable diverse courses 11A or 11B of travel, shown in FIG. 3, along a guideway structure 12.

Levitation for the vehicle is provided by alternating-current dynamoelectric machines which comprise levitation magnets 26, 30. The magnets are housed within cryostats 82, 84 which are attached to cryogen reservoirs 78, 80 and are fed by a common cryogenic support system 40. The magnets are most preferably of the super-ferric type wherein the main magnetic structure is ferromagnetic and the excitation conductor is a superconductor having high-current density. Suitable examples of superconducting magnets are described in my U.S. Pat. NO. 5,666,883, issued Sep. 16, 1997, and particularly the description relating to FIG. 6A therein. The entire disclosure by my U.S. application is incorporated herein by this reference hereto. Power for the compressor/liquefier required to support superconduction is obtained from a power pickup collector 48 which contacts guideway electrical polyphase strip conductor 49. This provides line frequency, 3-phase power and constitutes a sliding contact system which is suitable for low speed people mover applications. For high speed applications power transfer will be by high frequency inductive coupling to avoid abrasion associated with sliding contacts. The guideway strip conductors 49 are mounted on the vertical sidewall to avoid debris and rain from accumulating on the electrical surfaces.

A U-shaped elevated non-metallic guideway structure has a lateral cross-beam 100 and opposing upstanding sidewalls 54, 56 supported by a vertical pillar 102. The guideway is preferably made of non-ferromagnetic structural material, such as concrete or other composite. The cross-beam 100 is fitted with a set of non-ferromagnetic, electrically conductive strips 28, 32 which are embedded to form a smooth or flush surface of the cross-beam. The guideway structure, which may be elevated depending on the terrain or other considerations, can be a relatively light weight structure as compared with conventional magnetically levitated vehicle systems due to a feature of the present invention that reduces the amount of electrical material on the surface or sidewalls of the guideway. The strips 28, 32 may be made of aluminum and interact with vehicle mounted levitation magnets 26, 30 which create a primary magnetic flux path perpendicular to the plane of the vehicle undercarriage lower surface.

Each of the levitation magnets 26, 30 is independently powered by a hybrid electrical power supply 42, 44 having both direct-current (DC) and low-frequency alternating current (LAC) output. Supplies 42 and 44 are fed from a common phase delay rectifier and current filter unit 46 which is powered from the power pickup collector 48. An auxiliary battery power supply 310 provides direct current power in the event of an interruption of the main power input from the power pickup collector.

The vehicle carries a-set of main propulsion motors 22, 24, located along opposing lateral sidewalls of the vehicle undercarriage, which are transverse-flux linear induction motors (TFM) and combine the features of normal (non-superconducting) excitation, large-mechanical airgap clearance, high efficiency with the ability to provide lateral stability against sideways thrust by virtue of the TFM repulsive force which is produced in addition to the propulsive force. The propulsion motors are powered by variable-voltage, variable frequency inverters 74, 76 which are jointly powered by phase delay rectifier and harmonic filter unit 79 from power received through the power pickup collector 48. The propulsion motors provide the main source of propulsion for the vehicle through interaction with electrically conductive secondary members mounted on the guideway sidewalls 54, 56. The secondaries are shown to consist of the sandwich arrangement having a highly electrically conductive material 18, 20 mechanically fastened to the surface of corresponding magnetic steel return-flux plates 19, 21. The combination of the two metals provides for a highly efficient motor design as well as providing for controllable bidirectional attractive/repulsive forces between the propulsion motor primary 22, 24 and the associated secondary. Although the figures show the use of linear induction for the main propulsion motors, a construction involving linear synchronous motors and appropriate secondaries would also be possible with the present invention. For a linear synchronous motor, the secondary may take the form of one of three types: (1) a wound field structure overlaying a ferromagnetic flux return structure, or (2) a reluctance structure, or (3) a permanent magnet which may have a ferromagnetic backing plate. The wound field arrangement requires active excitation of the wound field structure by an external direct current supply. The alternative structure for the secondary member of a linear synchronous motor is a passive ferromagnetic plate which forms a reluctance grid having a variable magnetic reluctance as a function of longitudinal position. This arrangement does not require any active excitation of the secondary member. In the permanent magnet system, the secondary member is composed of magnets alternating in polarity as a function of longitudinal distance with the primary orientation of magnetic flux directed into the airgap so as to enter the primary structure at an angle perpendicular to the surface of the primary member.

As a lateral guidance feature, the primary of each of the main propulsion motors 22 and 24 may be divided on each side of the vehicle into separate components, having a polyphase wire connection allowing for the energization of one-half of the motor block. Such an arrangement will allow for the production of a force couple of the repulsive forces generated by the motors. This force couple will provide maneuvering assistance in curved sections in the following manner. When the vehicle enters a curve, one half of each of the motors will be fully energized in the propulsive-repulsive mode while the other half is turned off. A force couple will be created if the longitudinally offset, or cross-located motor halves, are energized. In this fashion, the vehicle tends to be pivoted while maintaining lateral airgaps. For curves that are shallow, for example those having radii greater than approximately twice the vehicle length, there is no need to have a differential in the motor excitation. Under these conditions, the entire motor block will be energized and the vehicle will follow the natural curvature of the guideway, maintaining a uniform airgap along the motor surfaces.

The vehicle of FIG. 1 has a total of four suspension magnets located at the four corners of the undercarriage. However the particular variables including vehicle length, passenger loading and suspension height may make it advantageous to increase the total number of suspension magnets, in which case each magnet would preferably have an independent DC/LAC power supply. Under steady cruising conditions, airgap vertical mechanical clearances 50, 52 are equal for left and right-hand side airgaps but will not be in turn-outs or under dynamic motions. The resulting change in airgap is detected by an airgap sensor 151, 153 and will result a corrective signal being sent to power supplies 42 and 44 to either decrease or increase the magnet excitation.

The vehicle passenger compartment floor consists of an electrically conductive, non-ferromagnetic shield 66 closest to the undercarriage apparatus, an electrically conductive, non-ferromagnetic shield 69 closest to the passenger compartment, and a ferromagnetic, solid shield 68 sandwiched between the conductive components 66 and 69. In practice, components 66, 68, and 69 extend the entire length of the vehicle and extend downwardly along the undercarriage top-portion sidewalls to form a more complete shielding effect.

The levitation system shown has the ability to levitate at zero and very low vehicle speeds due to use of low-frequency alternating current excitation of the levitation magnets 26, 30. This is contrasted with direct-current field excitation which requires vehicle speeds exceeding approximately 30 km/hr to achieve levitation. The system shown therefore eliminates the need for wheels for providing vehicle support for operating speeds up to 30 km/hr, as was required with the use of direct current excitation.

The use of superconducting excitation of the levitation magnets provides for a light-weight vehicle undercarriage which directly translates into an allowance for light-weight and cost efficient guideway structures. For example, the weight of a fully loaded 10.7 meter, 70 passenger vehicle is estimated to be 16 metric tons when high field superconducting magnets are utilized. This allows for a concrete guideway structure having a weight of 36 metric tons per 33 meter span, or 23.4 metric tons per 33 meter span when advanced composites are used for the guideway top U-shape structure. This compares with a conventional guideway of 42 or more metric tons per 33 meters. The reduction in the weight of the U-shape structure in turn allows for reduction in the size of the remaining structure and foundation.

The use of separate levitation and propulsion apparatus also allows for differing airgap magnitudes between the different magnet systems. For example, propulsion airgaps 58, 60 are typically optimized at 25–38 mm per gap whereas suspension airgaps will range from 50–75 mm depending on vehicle weight and the field strength of the superconducting magnets.

TABLE 1

| Characteristic Parameters and Dimensions Vehicle | |
| --- | --- |
| Laden weight | 18,000 kg |
| Width | 254 cm. |
| Length | 10.7 m. |
| Height | 3.35 m. |
| No. of levitation magnets | 4 |
| Loading per levitation magnet | 4500 kg |
| Surface area per magnet | 0.394 sq. m. |
| Specific loading density/magnet | 11,416 kg/sq. m. |
| Levitation height | 50 mm. |
| Suspension magnet transverse pitch | 0.292 m. |
| Coolant | Liquid helium |
| No. of propulsion motors | 2 |
| Type of propulsion motor | Trans.-flux, induction |
| Coolant for stator windings | Chilled water |
| Active length of primary | 1.78 m. |
| Active width of primary | 0.305 m. |
| Surface area/motor | 0.544 sq. m. |
| Motor thrust rating/unit | 7.5 kN |
| Surface thrust/density | 13,764 N/sq. m. |
| Reaction strip width | 0.305 m. |
| Guideway | |
| Inside width of channel | 262 cm. |
| Sidewall height | 0.95 m. |
| Overall width | 290 cm. |
| Span length | 33.0 m. |
| Sidewall clearance to vehicle | 3.81 cm. |

The superconducting levitation magnets are preferably of mixed magnetic-permeability ("mixed-mu") wherein the primary structure 26, 30 contains a ferromagnetic core forming a magnetic return-path for the flux produced by the superconducting coils. This has the dual effect of attenuating the stray magnetic fields to a very low level in the vehicle passenger compartment and undercarriage as well as focusing the magnetic flux more efficiently for interaction with the track-mounted secondary conductor. The shield plate 68 underneath the passenger floor serves as a secondary magnetic shield. The resulting magnetic flux density on the surface of the floor will not exceed 5.0 milli-Tesla under any combination of operating conditions of the "mixed-mu" levitation magnets and transverse flux motors. The use of a ferromagnetic flux return path for a linear induction motor, or ferromagnetic pole-pieces for a linear synchronous motor, is a feature that permits efficient use of nearby non-superconducting apparatus such as the main propulsion motor primary without need for special shielding or inter-compartment magnetic isolation.

At certain locations, such as, for example, split switching, double turnout crossings, switching diamond crossings, and pivot turning, the manner of the courses of travel required by the vehicle necessitates discontinuance of the guideway sidewalls whereby the main sidewall propulsion motors cannot be used. The present invention provides for auxiliary propulsion means which are distinct from the main propulsion motors and which will supply vehicle propulsion at such locations of the guideway where the travel required renders the main motors ineffective. Referring to FIG. 2, there is shown a vehicle at the start of a switching zone wherein the lateral spacing of the upstanding sidewalls 54, 56 of the guideway is increased to the point where the power pickup collector 48 disengages from the conductor strip 49 and is not capable of transmitting power from the guideway sidewalls to the vehicle. The increased airgaps 58A, 60A will also render the propulsion motors 22, 24 to be ineffective for generating the required propulsion even if the motors were to be powered by a back-up power supply in lieu of the power from power pickup collector 48.

Turning to FIG. 3, a plan view of a vehicle guideway in a track switching area is shown. It is seen that at the point where the guideway diverges into separate paths 11A and 11B, it will be required that one or both of the guideway sidewalls 54, 56 be discontinuous for some distance to accommodate the overlapping portions of the two pathways. This will necessarily result in the inoperability of the associated main propulsion motor or motors. To provide for vehicle propulsion in the area of guideway sidewall discontinuity, each of the diverging paths of the track is fitted with a series of transverse-flux, or longitudinal-flux, linear motor primaries 38 which are embedded flush in the top guideway surface and which are powered by a polyphase alternating-current supply. To provide for steering of the vehicle within the switch area, each of the diverging paths of the guideway is also fitted with a series of oppositely located null flux loops 62, 64 which interact with a portion of the flux generated by the levitation magnets 26, 30 to produce a steering force $F_s$ as will be discussed further.

Figure 5:
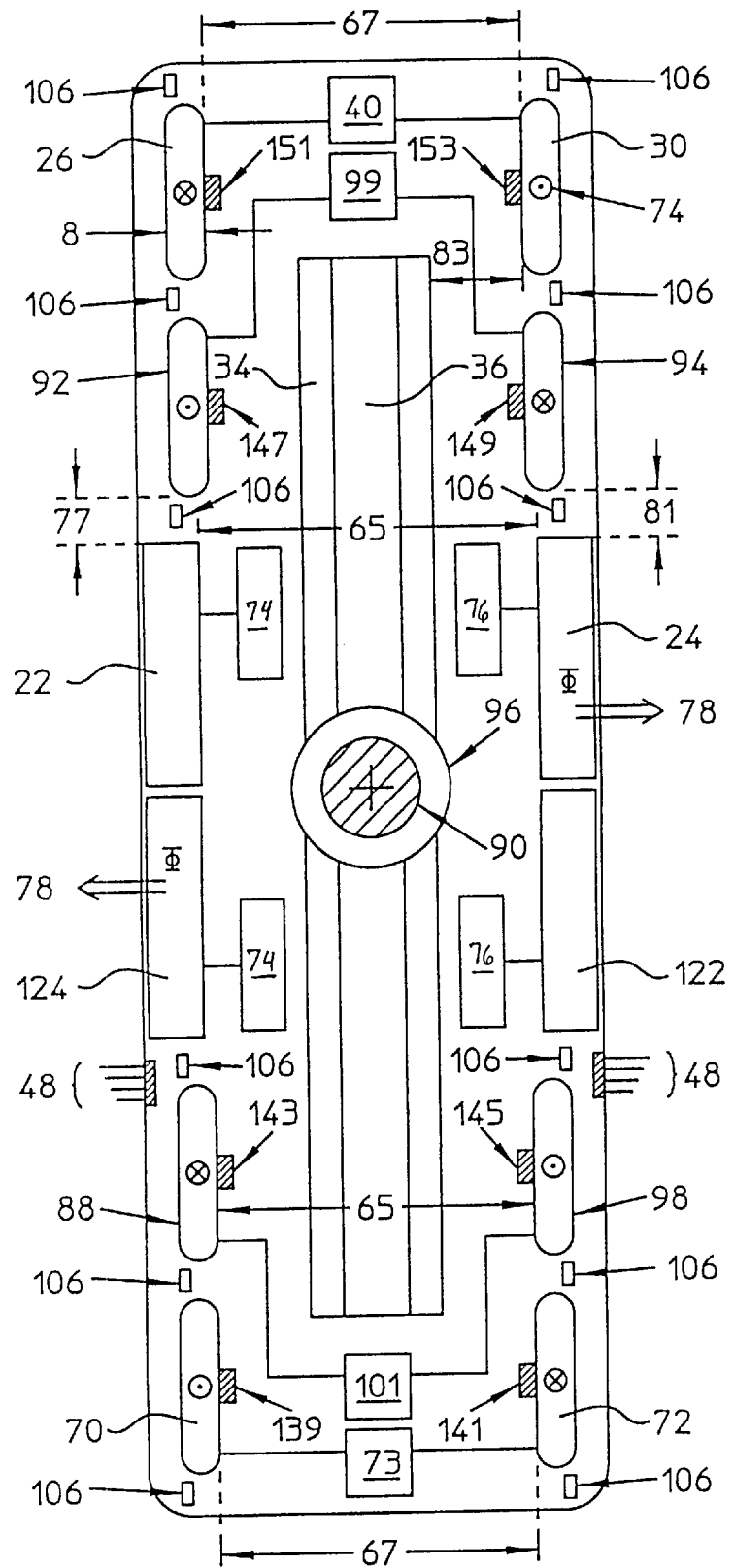
FIG. 5 is a plan view of a second embodiment of a magnetically levitated vehicle to execute pivot turns according to the present invention.

The vehicle, in turn, is fitted with an auxiliary passive aluminum or conductive plate 34 and magnetic flux-return plate 36, shown in FIG. 2 to be symmetrically located with respect to a longitudinal centerline of the vehicle. The plates 34 and 36 are also symmetrically located with respect to a lateral centerline of the vehicle and generally have an overall length that is approximately 60–80 percent of the length of the vehicle, as shown in FIG. 5. The lateral width of plate 34 exceeds the width of plate 36 to create "overhang" electrical material, which aids in the thrust production in the switch zone.

Figure 4:
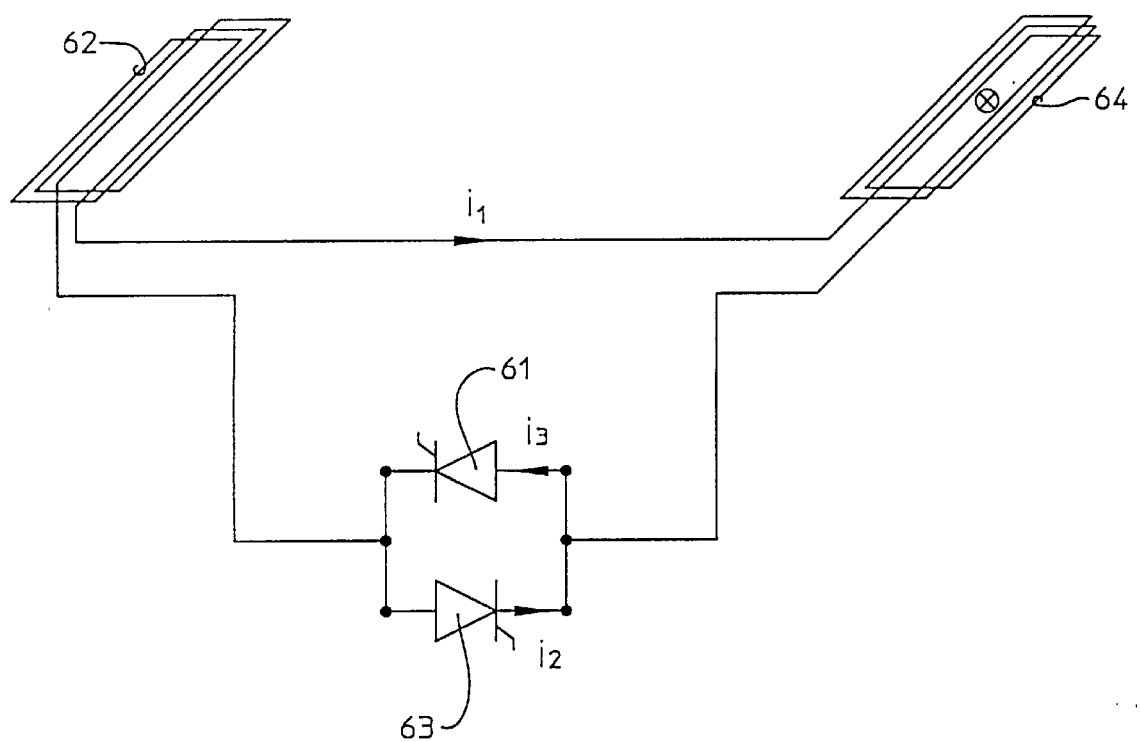
FIG. 4 is an electrical schematic diagram of a thyristor arrangement to control the null flux loop arrangement of FIG. 2.

When the vehicle approaches a switch zone, the main propulsion motors 22, 24 are switched off and the auxiliary switching motors 38 are energized by the polyphase, alternating-current supply for switch coasting power. The steering of the vehicle within the switch zone is primarily determined by an electronic control system which short-circuits one of the null-flux guidance loops 62 or 64 depending on whether a left hand or right hand direction is desired. The construction of the oppositely located null flux loops without a current regulator is known to provide a lateral stabilizing feature in which movement of the vehicle away from a centered position, for example under wind forces, creates an unbalanced induced voltage between the two sides thereby creating a restoring force tending to re-center the vehicle. In contrast, the current regulating apparatus of the present invention, shown in FIG. 2, consisting of solid-state thyristor electrical switches 61A, 61B, associated with the left side null flux loop 62 and thyristor switches 63A, 63B associated with the right side null flux loop 64, and cross-linking power resistor 65, creates the unbalanced induced voltage between the oppositely located null flux loops thereby creating a steering force tending to drive the vehicle either left or right. The thyristor switches have a rapid turn-on time, such as five microseconds, and thus provide nearly instant setup of the track steering circuit without need for any mechanical movement of guideway structure. An alternative circuit to control the null flux loops is shown in FIG. 4 wherein thyristors 61, 63 are connected in anti-parallel as a module with left and right side null flux loops 62, 64 connected in a series-bucking fashion.

As seen in FIGS. 2 and 3, the guideway mounted secondary 32 associated with the right hand side levitation magnet 30 will be widened in the switch area for travel onto course 11B in order to accommodate the entry of the vehicle into the right hand turn seen in FIG. 3. As the vehicle approaches the right hand turn, thyristors 61A and 61B will be in the off-state to prevent induced current from developing in the left hand loop 62, and thyristors 63A and 63B will be in the on-state thereby creating induced current only in the right hand loop 64 resulting in an electrodynamic steering force $F_s$ acting between loop 64 and levitation magnet 30 tending to drive the vehicle to the right. The provision of ferromagnetic laminated plate 59 located beneath the left side guideway mounted secondary 28 in the switch area of course 11B serves to focus the levitating force flux acting between magnet 26 and secondary 28 yielding a higher levitation efficiency or magnetic Reynolds number for the left side magnet as compared with the right side magnet. This provides a measure of roll stability to counteract the additional vertical component of the steering force $F_s$ created by loop 64 acting on the right side of the vehicle. The steering force, $F_s$ can be modulated or reduced from 100% levels by phase-back operation of the thyristor pair, accomplishing phase-chopping of the null-flux loop induced current without the need for external power source.

The fact that the null-flux loops are open-circuit, phase-back modulated, or maintained in a short circuited state means that no external power source is required, thereby providing a fail-safe switching scheme even in the event of total system power failure. The thyristor switches 61, 63 are commanded and sent a gate-signal by either an optical light pulse or a low-level battery power supply, and therefore only the auxiliary switching motors 38 in the guideway structure require active high-power excitation. The propulsion thrust required from the auxiliary propulsion in the switch area will be much lower than that which must be generated by the main motors because switching will occur on near-level grades and without the need for rapid acceleration of the vehicle mass. Accordingly, the thrust rating for each of the auxiliary motors 38 is approximately 25 percent of that of the main motors 22, 24. For a 16 metric ton vehicle, the thrust rating of each of the auxiliary motors 38 will be approximately 3–4 kN. An important structural feature of the invention resides in the co-planar arrangement of the guideway mounted primaries 38, the null flux loops 62 and 64, and the guideway mounted secondaries 28 and 32.

The use of superconducting coils for the levitation system means that resistance to current in the coils will approach zero. This is an important feature in relation to the operation of the vehicle in the areas requiring the auxiliary motors, since the levitation magnets on board the vehicle will need to continue to provide lift for the vehicle after the loss of the main power supply from collector 48. The superconducting coils, once fully charged, have low power requirements to maintain their levitation function during the short periods of time required for switching and pivoting. This characteristic means that the superconducting coils can run on auxiliary storage battery supply 310, shown in FIG. 1, converted to alternating current through inverter unit 46 and hybrid power supplies 42, 44.

Turning to FIG. 5, there is shown a vehicle having two levitation magnets in each corner of the vehicle undercarriage arranged in the following manner:

|       | Magnet Designation | Electrical Phase Angle (degrees) |
|-------|--------------------|----------------------------------|
| Set 1 | 26, 92             | 0, 180                           |
| Set 2 | 30, 94             | 180, 0                           |
| Set 3 | 70, 88             | 0, 180                           |
| Set 4 | 72, 98             | 180, 0                           |

Phasing of the magnets in the manner shown above provides a useful feature when alternating current excitation is utilized. An arrangement of alternating polarity at each of the vehicle corners establishes a dipolar field which reduces the drag component on the levitation magnets to a value lower than through the use of conventional DC excited magnets. To optimize the reduction in the drag component, however, the longitudinal spacing of the magnets should be such as to produce an induced secondary current in conductors 28, 32 having a substantially fundamental traveling wave because a large longitudinal space between adjacent magnets will weaken the effect which the dipolar field has on the electromagnetic drag. Each of the cryogenic support systems supplies two opposing magnets at a given location along the length of the vehicle thereby avoiding cryogenic piping extending over the length of the vehicle. In this fashion, magnets 26, 30 are maintained by cryogenic supply 40, magnets 92, 94 by supply 99, magnets 88, 98 by supply by 101, magnets 70, 72 by supply 73. The direction of alternating magnetic flux is shown by the arrow indications on the levitation magnets at one particular instant of time.

Figure 6:
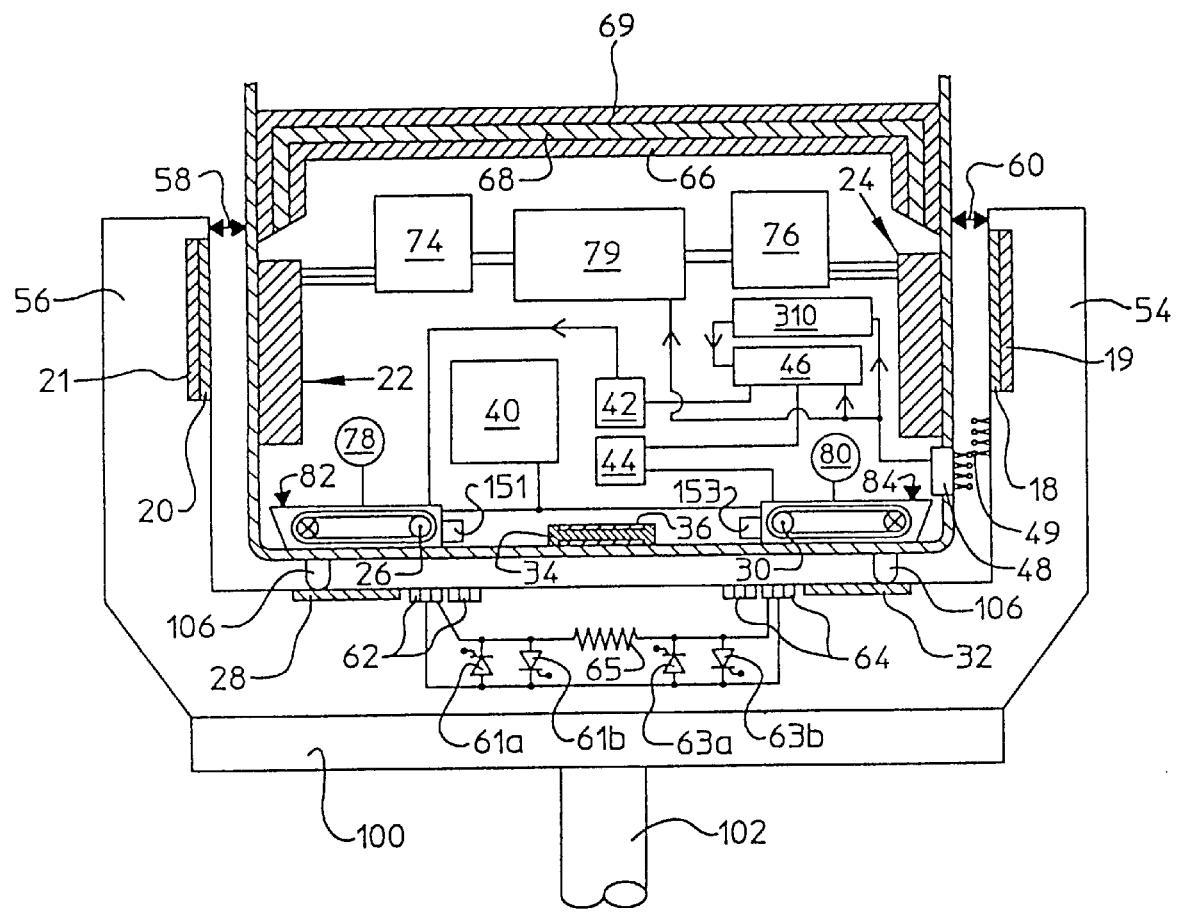
FIG. 6 is an elevational view in section of a magnetically levitated vehicle according to the present invention shown at rest with mechanical supports on the guideway structure.

The vehicle is equipped with support skids 106, as shown in FIG. 2, 5, and 6, which are located at sites adjacent to and between the levitation magnets, for contacting the conductive strips 28, 32 and supporting the vehicle during times when the vehicle is out of service and the levitation magnets are not operating. The support members 106 are preferably coated with a friction reducing substance such as a polytetrafluoroethylene.

Each levitation magnet is fitted with an independent alternating-current power supply to permit adjustment of suspension height each of the eight suspension points thereby allowing for compensation of heave roll or pitch motion of the vehicle or differential in passenger weight loadings from front to rear or side to side of vehicle. This adjustment will occur by automatic field AC-excitation control of each levitation magnet on-board the vehicle in response to continuous monitoring of pitch, roll, heave and airgap clearances at each levitation magnet position by airgap sensors 139, 141, 143, 145, 147, 149, 151 and 153.

Figure 8:
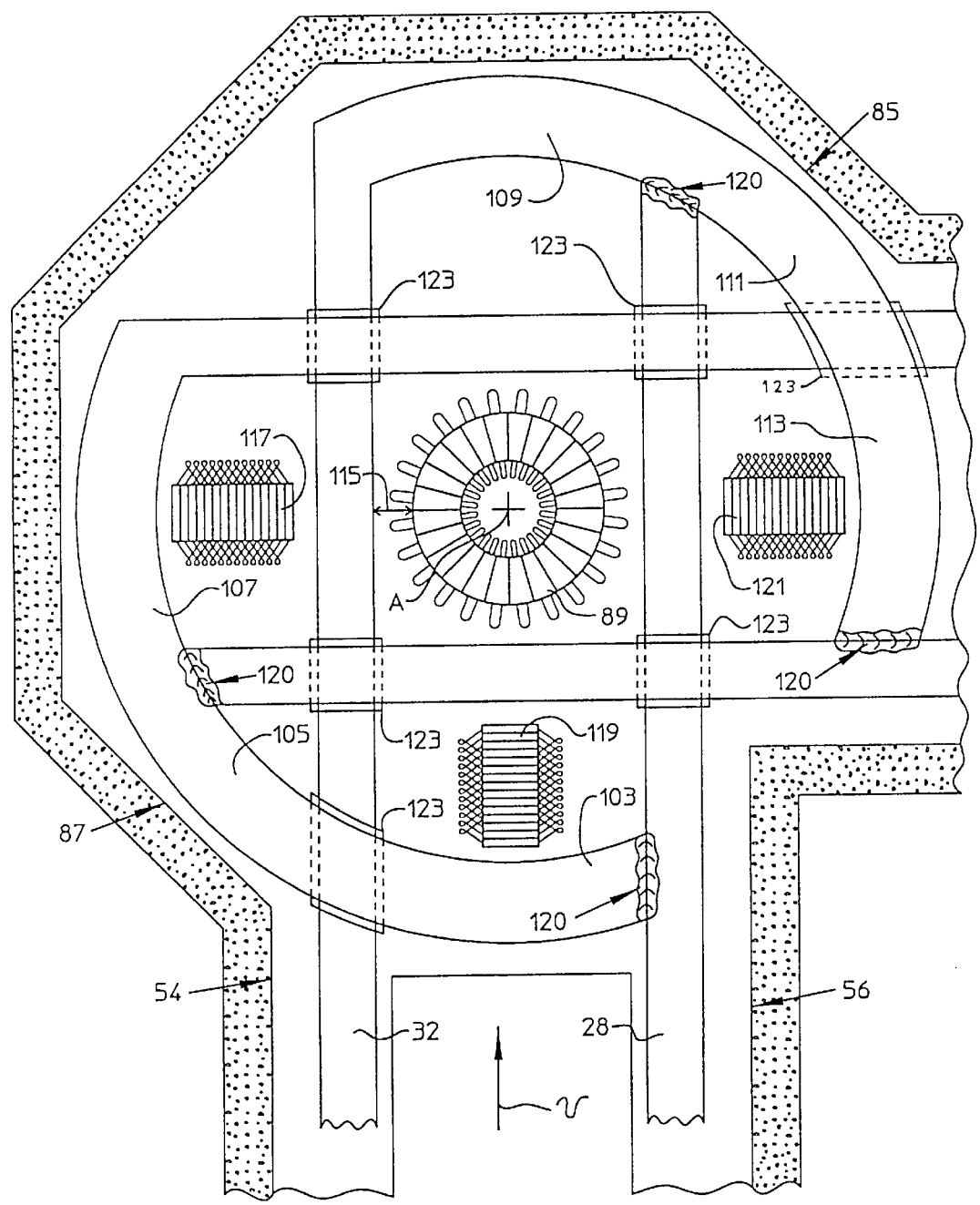
FIG. 8 is a plan view of a pivot area for the vehicle of FIG. 5.

FIG. 5 also shows a circular pivot reaction plate 96 in the middle of the undercarriage which is used exclusively for non-translational pivot turning of the vehicle about an axis located at the center of the circular plate. The circular plate is an electrically conductive plate which has a ferromagnetic flux-return plate 90 and which is electrically combined with the switch zone reaction plate 34, 36. The circular plate 96 is a high-conductivity non-ferromagnetic plate of approximately 0.42 per unit of the vehicle width for its diameter and of sufficient thickness to allow induced current action to occur without excessive temperature rise. High conductivity aluminum 6101-T64 plate of thickness 9.5 mm or larger is sufficient to form plate 96. The circular pivot reaction plate will interact with a corresponding axial-flux induction motor 89, as shown in FIG. 8, embedded in the guideway at the pivot location for producing the rotary torque about a vertical axis A sufficient to execute the non-translational pivot turning of the vehicle.

The mechanical clearances between the levitation and propulsion members is critical to prevent interference with the flux patterns necessary to the proper functioning of the individual members. Accordingly dimensions 77, 81 and 83 are noted in FIG. 5. Dimension 77 or 81 is the longitudinal distance between the end of the levitation magnet and the edge of the propulsion motor and should exceed at least four (4) times the transverse pole-pitch 8 of each levitation magnet. Dimension 83 is the distance between the side wall or edge of a levitation magnet and the edge of switching reaction plate 34 and should be a minimum of six transverse pole-pitches of the levitation magnet.

There exist strong electromagnetic attractive forces between the main propulsion motor primary and the levitation magnets. However these are static forces which are restrained by non-magnetic mechanical supports fastening the ferromagnetic structure to the vehicle frame.

Figure 7:
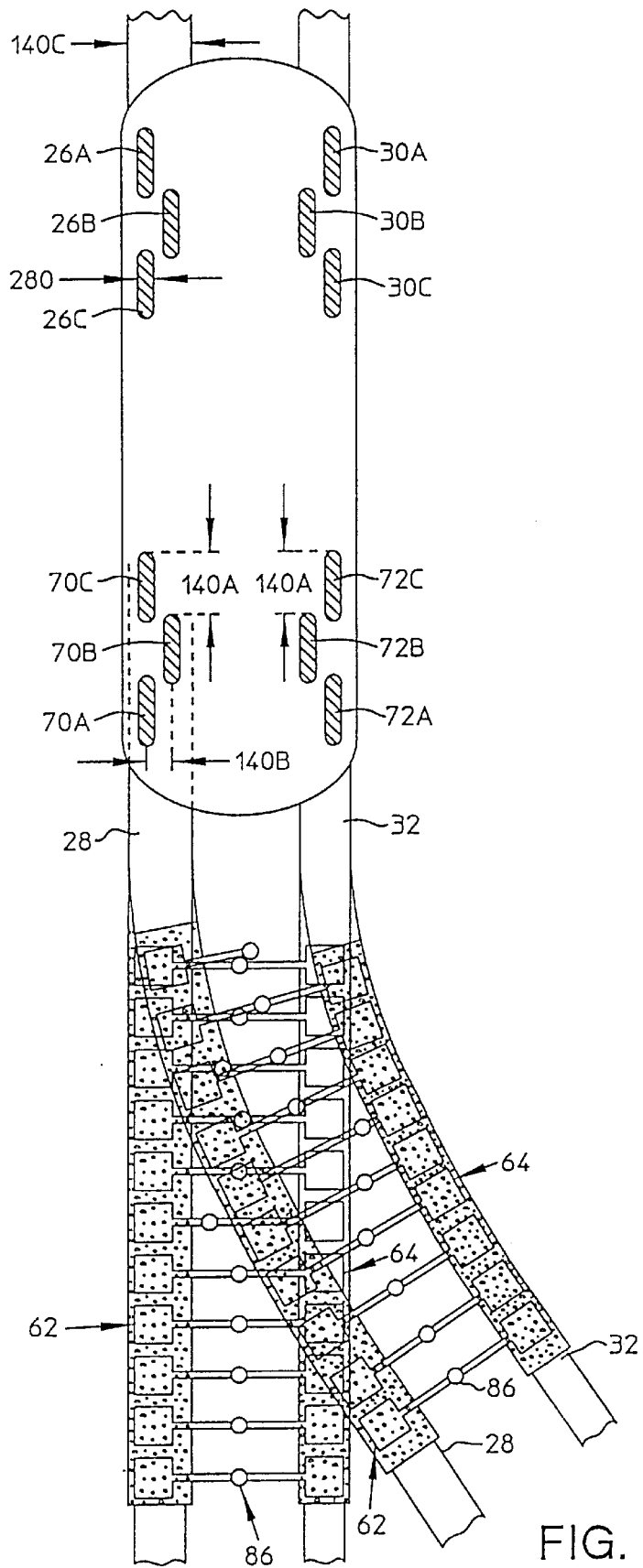
FIG. 7 is a plan view of a magnetically levitated vehicle according to the present invention in which the spacing and arrangement of the levitating magnets provides propulsion and lateral guidance for the vehicle in a guideway switching area.

FIG. 7 shows a variation on the use of multiple AC-excited magnets at each corner of the vehicle arranged to create a propulsion function in the levitation magnets in addition to the major functions of lift and lateral guidance. The magnets, 26A–C, 30A–C, 70A–C and 72A–C are spaced from adjacent magnets by a distance 140A, such that there exists a longitudinal overlap between adjacent magnets. The magnets are also arranged such that adjacent magnets are laterally offset by a distance 140B. Each of the magnets is powered by an independent single-phase inverter supply which has the ability to produce phasing of each magnet so that adjacent magnets are operating at the same frequency although at a predetermined phase difference, of for example 120 degrees. Such a phasing arrangement will provide a propulsion or braking capability in addition to the functions of main levitation and lateral guidance. All of the magnets at a particular corner of the vehicle will share a common non-segmented secondary reaction conductor 28, 32 carried by the guideway which must be designed for the production of induced currents sufficient to initiate and carry the propulsion or braking forces as well as sized to have a width, 140C sufficient to accommodate the overall width encompassed by the offset magnets and to provide an overhang allowance to maximize electromagnetic-induction efficiency.

To provide for steering of the vehicle within the switch area, each of the diverging paths of the guideway is also fitted with a series of oppositely located null flux loops 62, 64 which interact with a portion of the flux generated by the levitation magnets 26, 30 to produce a steering force $F_s$ as will be discussed further.

FIG. 8 shows the detail of the guideway at the location of a non-translational pivot turn. The figure shows the location of original sidewalls 54, 56 and of turning sidewalls 85, 87. The figure shows a guideway construction designed for a 90 degree pivot turn, although pivots through angles of up to 360 degrees are possible using the pivot turning zone of FIG. 8. The guideway in the pivot location includes the curved conductive levitation strips 103, 105, 107, 109, 111, 113 in addition to the main levitation strips 28, 32 which are of the same material composition and thickness as the main levitation strips. The conductive strips are welded at joints 120 to ensure electrical continuity. Also included is an axial flux motor primary 89 having the principal direction of flux oriented vertically and the primary conductors oriented radially. The axial flux motor provides the flux necessary to react with the circular pivot plate 96 mounted on the vehicle. The diameter of the axial flux motor permits sufficient electromagnetic clearance 115 between the edge of the motor primary and the levitation strip to reduce any stray induction from component 89 into nearby conductive strips. For example, clearance 115 is approximately 0.35–0.45 m per side based upon a 0.270–0.292 m wide levitation strip, 28, 32.

FIG. 8 also shows the addition of three track mounted linear induction, or linear synchronous motors 117, 119 and 121 which are necessary to propel the vehicle into and out of the pivot turn location. This auxiliary propulsion is necessary since the required clearance provided by turning walls 85, 87 limits the utility of the main sidewall propulsion motors. The track mounted propulsion motor 119 provides the final thrust, or braking force, needed for the vehicle to enter the pivot location and track mounted propulsion motors 117, 121 provide the thrust necessary for the vehicle to exit the pivot location after the pivot is completed. Note that the vehicle members 34, 36 as shown in FIG. 6 will provide the necessary reaction plate for the track mounted motors in the pivot location and that the vehicle undercarriage is perfectly flush. Second, the placement of the four superconducting suspension magnets at the four corners of the vehicle limits any interaction of this subsystem with the specialized propulsion motors specific to the pivot location, namely axial thrust motor 89, and track mounted motors 117, 119, 121. During all motions of the vehicle in the pivot location, the high field superconducting magnets are kept at least 0.32 m apart from any ferromagnetic structures, thereby reducing stray magnetic forces or stray induced current losses.

A third embodiment of auxiliary vehicle propulsion to augment the main sidewall propulsion motors, particularly in banked horizontal curves where it may be desirable to remove the guideway sidewalls, is seen in FIGS. 9 through 12. The third embodiment incorporates the same construction for the levitation magnets and the main propulsion motors of the embodiments of the prior figures. The guideway structure 100 is provided with a trough, which extends longitudinally throughout the entire length of a curved section, in the same direction as the vehicle moves along the guideway. The trough is bounded at its opposite sides by sidewalls that are angularly orientated so as to establish an undercut relation and thereby form an acute angle with respect to the planar upper surface of the guideway. As seen in FIGS. 9 and 14A–15, elevational views in section, the trough has the shape of a dovetail established by a planar trough floor 108 extending between acute angled sidewalls 110. The function of the dovetail relationship between the guideway and the structure forming the propulsion motors in their deployed state is to control the vehicle to limited vertical motion in the presence of electromagnetic forces as well as in a failure mode through a mechanical wedging effect preventing the vehicle from disengaging from the guideway.

Figure 9:
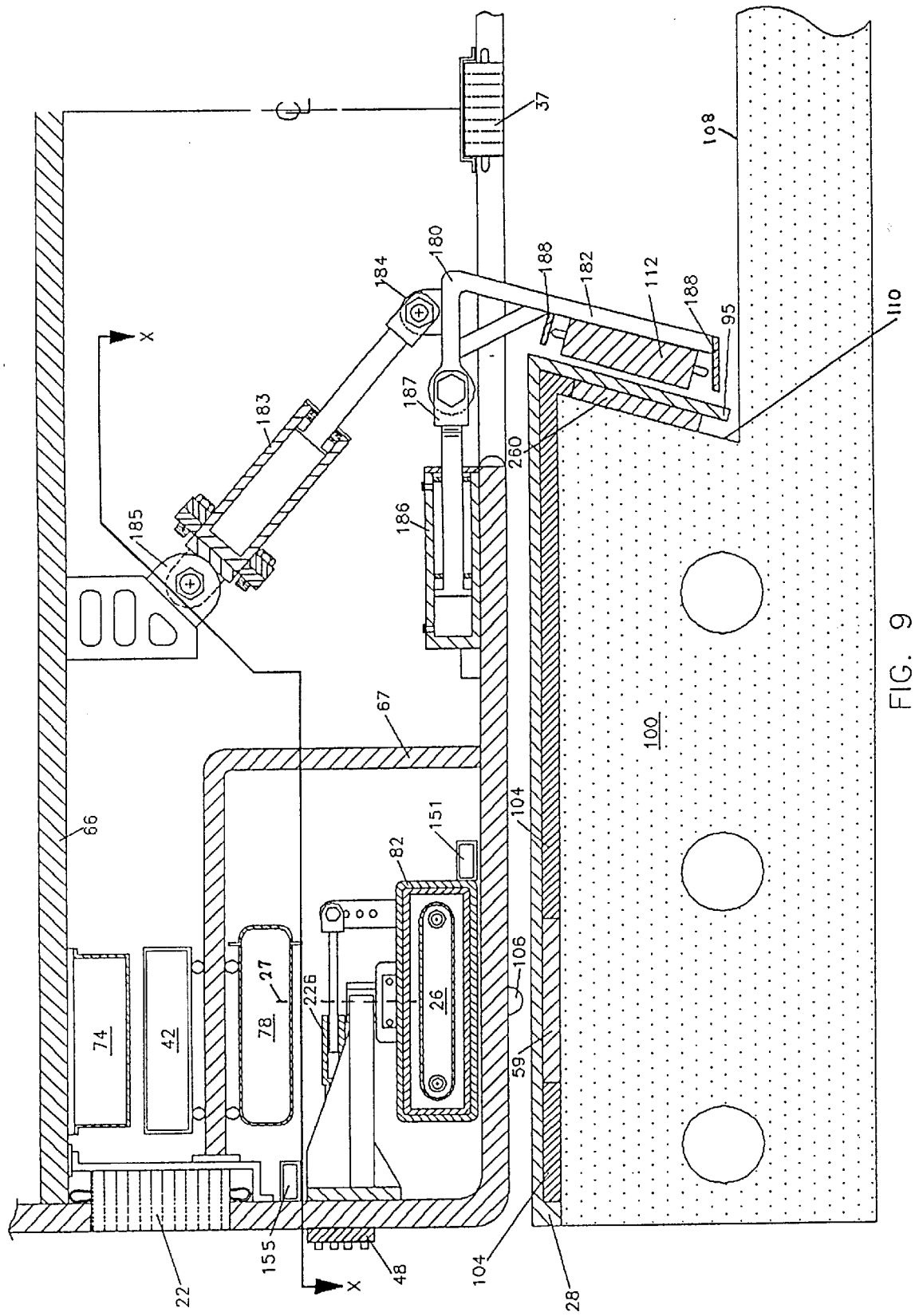
FIG. 9 is a partial elevational view in section of a third embodiment of magnetically levitated vehicle, and the associated auxiliary propulsion motors shown in a deployed position in relation to the guideway structure, according to the present invention.

Referring to FIG. 9 showing the vehicle left side, the system includes a dovetail orientable linear induction, or linear synchronous, motor 112, which is one of a series of six independent auxiliary dovetail motors located on the left side of the vehicle. The right side of the vehicle, which is not seen, will also have six independent dovetail motors similarly arranged in a mirrored relationship to the six left side motors.

A structural material 104, such as MICARTA™ or other suitable composite, is shown sandwiched between conductor 28 and the guideway 100 abutting the ferromagnetic flux return plate 59. The material 104 has the properties of an electrical insulator and a structural strength sufficient to transmit the vertical loads applied across the levitation strip to the guideway. The airgap located under the levitation magnet 26 is measured by airgap sensor 151 which may be a capacitive-type distance sensor. An alternate embodiment is shown whereby a wound-secondary LIM or LSM unit 37 replaces the passive magnetic assembly 34,36 shown in FIG. 5 for use in switching or pivot zones.

Figure 10:
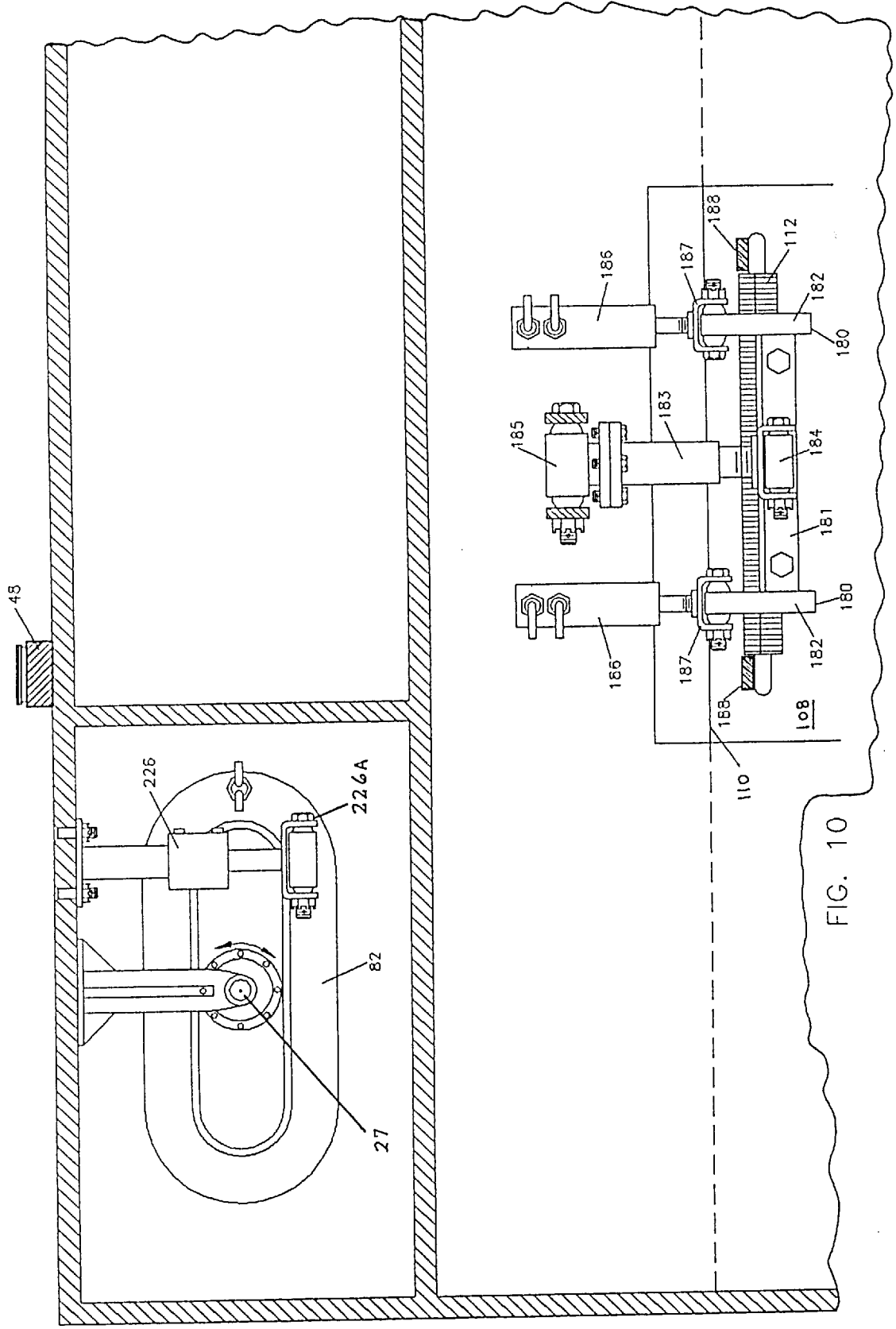
FIG. 10 is a plan view in section taken along lines X—X of FIG. 9.

Each of the independent dovetail motors is supported on a deployment frame 180. The deployment frame, which is best seen in FIG. 10, includes a cross beam 181 from which support arms 182 for the motor extend at opposite ends. The main support for the deployment frame is provided by the central actuator 183 which is pivotably connected at an end to the deployment frame through ball hinge assembly 184. The opposite end of the deployment actuator is pivotably connected to the vehicle undercarriage through ball hinge assembly 185. Each of the support arms 182 is pivotably connected to an end of a differential actuator 186 through ball hinge assembly 187. This construction allows for pivoting of the deployment frame 180 between a first storage position and a second deployed position.

In the first storage position, the piston of the deployment actuator 183 is retracted for location of the deployment frame within the vehicle undercarriage. For deployment of frame 180, the piston of central actuator 183 extends from the actuator causing rotation of the frame about the ball hinges 187 which connect the frame to the differential actuators. As best seen in FIG. 9, the control of the lateral position of the frame with respect to the vehicle will involve coordinated control of the central actuator 183 and the differential actuators 186. For a given amount of extension of the pistons of the differential actuators, which operate only in a generally horizontal plane, there will be associated a singular amount of extension of the piston of the central actuator which will orient the frame so that the attached motor 112 will be oriented generally parallel to the surface of secondary member 95 which is carried on the guideway sidewall. Most preferably, the coordinated extension of the pistons for each frame will initially deploy the frame as nearly as possibly to that position ideal for operating the vehicle in a straight section of track.

Once deployed, the dovetail motor support system provides for control over the gap existing between the motor and the guideway sidewall in the following manner. Each of the deployment frames carries a pair of gap sensors 188, one on each of the support arms 182 near the attachment of the motor 112 to the support arm for measuring the distance between the motor and the guideway supported secondary member 95 and producing a data signal. The information, in the form of the data signal, provided by the gap sensors located adjacent to opposing ends of the motor 112 will be used to optimize the positioning of the motor 112 both with respect to its lateral position and with respect to its angular orientation, best seen in the plan view of FIG. 10.

Change in lateral positioning of the frame is accomplished by coordinated extension or retraction of the central actuator 183 with extension or retraction of the differential actuators 186 such that the lateral change in position at the center of the frame caused by change in the central actuator is matched by the lateral change in position at the ends of the frame caused by change in the differential actuators. The angulation of the frame about the central ball hinge 184 is controlled by differential extension or retraction of hydraulic or electrically-actuated pistons of the differential actuators 186. In this fashion, the three actuators use the gap measurements from the opposing gap sensors 188 to ensure optimum orientation of the motor with respect to the guideways by matching the gap distances of the opposing ends of the motor. Such independent control of the angular orientation of each dovetail motor is of particular importance in curving sections of guideway as will be discussed in greater detail.

In FIGS. 9 and 10 there is illustrated an arrangement of parts to accomplish pivotal positioning of the levitation magnets 26, 30, 70 and 72 so as to maintain the forward and aft positions of the magnetic winding to track with the underlying curved portion of secondaries 28 and 32. The cryostat for levitation magnets 26, 30, 70 and 72 are fitted with a heavy duty pivot shaft having a central vertical pivot axis 27, 31, 127 and 131, respectively. Electrical servo-actuators 226, 230, 227 and 231 are mounted to the vehicle undercarriage and have their moveable element secured by a universal mount 226A to one end of the cryostat in an eccentric relation to the pivot axis thereof.

Figure 11:
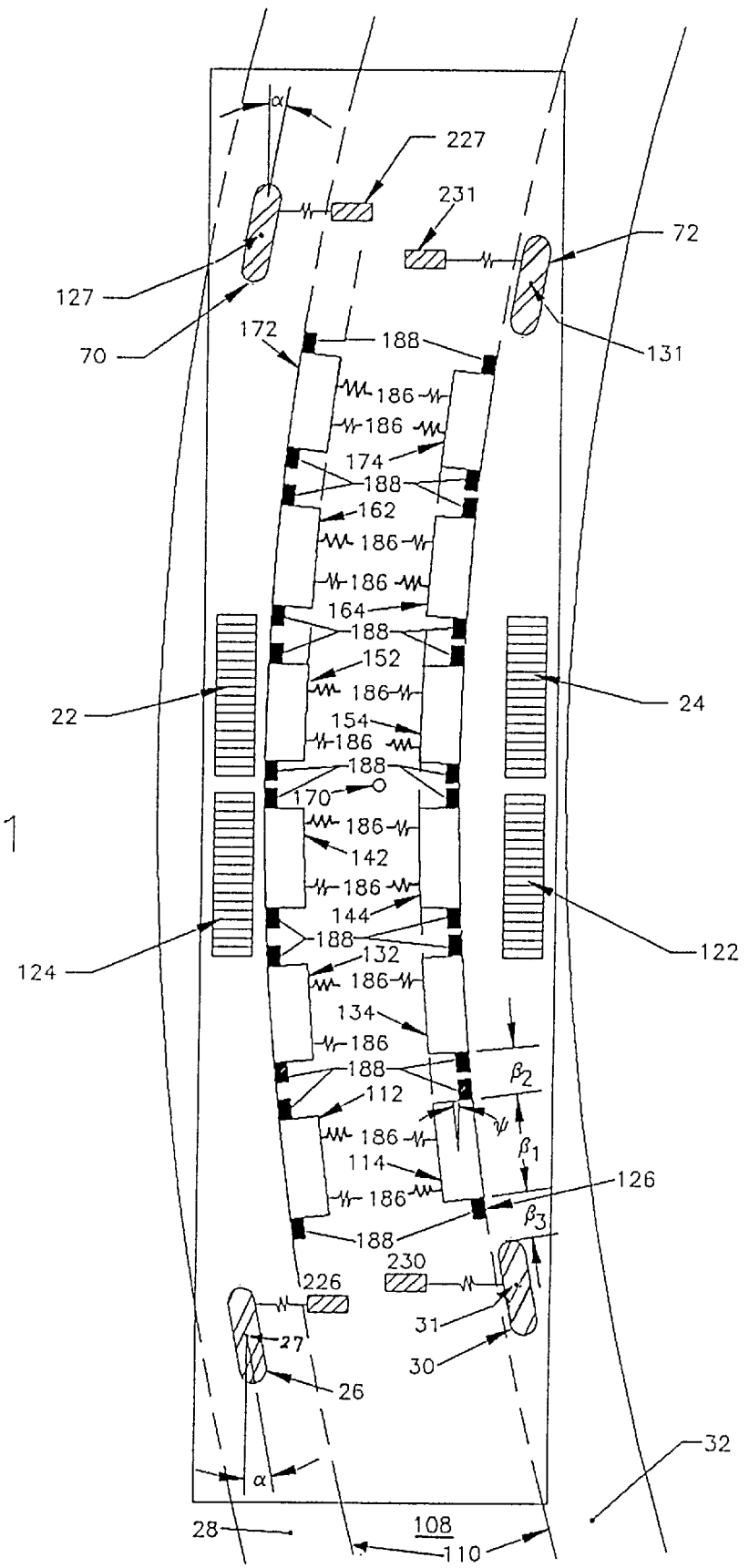
FIG. 11 is a schematic layout illustration of the levitation and propulsion motors vehicle while it is partly shown in FIG. 9.

Referring to the schematic view of a vehicle in a right hand turn shown in FIG. 11, the necessity for independent control over both lateral and angular control of each motor in a curving section of track is evident. The figure shows the left side dovetail motors 112, 132, 142, 152, 162, and 172, from rear to front of the vehicle, and the right side motors 114, 134, 144, 154, 164 and 174. As can be seen, for both sides of the vehicle, the lateral positioning of the motors varies along the length of the vehicle to accommodate the curving guideway. As is also evident, the angular orientation of the motor will also have to be variable in order to provide a tangent orientation of the motors with respect to the curving guideway. The described system is able to accommodate compound curves and includes control over the angular orientation of the levitation magnets 26,30,70, and 72 through the actuators 226, 230, 227, and 231, respectively, best seen in FIG. 11.

The dovetail motor primaries carried by the frames 180 are operative with secondaries on the guideway sidewalls. As seen in FIG. 9, for a linear induction motor system, the secondary comprises a lateral reaction conductor pad 95 which is composed of non-ferromagnetic, electrically conductive strips. Underneath pad 95 is a ferromagnetic flux return plate which directs the magnetic flux emanating from the primary to cross the airgap with a lower amount of magnetic leakage flux and improves overall efficiency to the propulsion motor. The strip conductor 28 for the levitation magnet is shown mechanically and electrically connected to the lateral reaction conductor pad 95. However, in the most general case, the separate functions of levitation and propulsion/guidance requires distinct dimensioning for conductor thickness and width for optimum performance levels. In general the levitation conductor 28 is thicker than the lateral reaction conductor pads 95. Preferably, both conductors are composed of a highly conductive material, such as aluminum Type 6101-T64.

Figure 12:
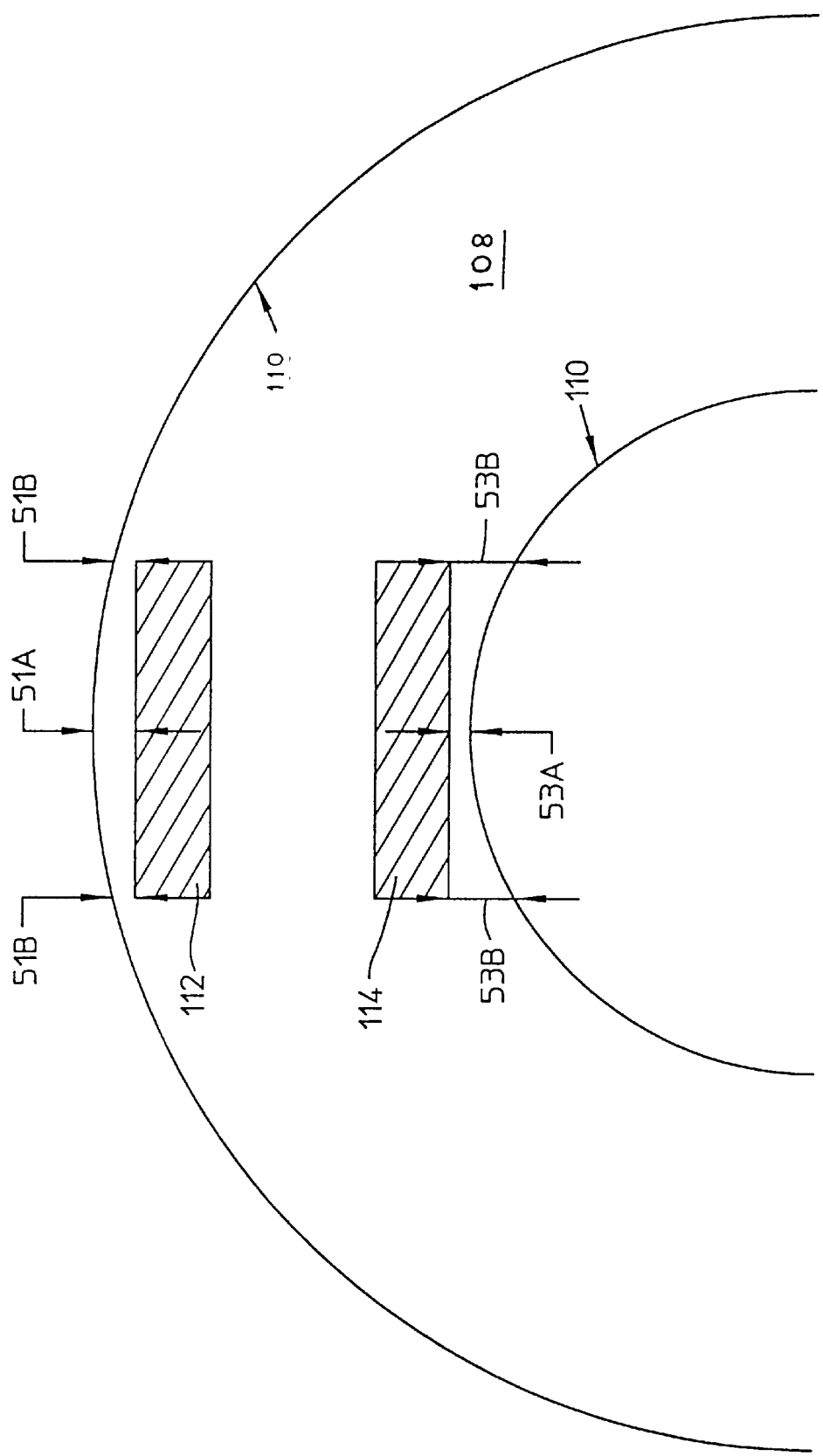
FIG. 12 is diagrammatical illustration of the orientation of an auxiliary motor of the vehicle of FIG. 9 in relation to a curving section of guideway.

Even though the angular orientation of the dovetail auxiliary motor primaries is kept generally parallel to the guideway sidewall, there will exist variation in airgap over the length of the primary since the surface of the guideway is curving or may have misalignments due to shifting of the overall structure and the face of the motor is essentially planar. FIG. 12 diagrammatically shows the variations in airgap along oppositely disposed motor primaries on the vehicle. The figure shows that one of the primaries will have a larger airgap 51A at the center as compared with airgap 51B at the ends while the oppositely located primary will have a smaller airgap 53A as compared with airgap 53B at the ends. However, because the length of a given motor is minimized by the provision of six, or greater, separately orientable motors per side, the effect of this variation in airgap along the length of the motor is limited.

Each auxiliary motor is wound with a polyphase winding to produce a propulsive force simultaneous with a repulsive-lateral force. Where the guideway sidewalls adjacent to the main propulsion motors must be removed for clearance purposes or on banked turns, the grouping of dovetail motors will provide the entire vehicle propulsive force, forming a substitute for the inoperative main sidewall motors.

Referring again to FIG. 11, the levitation magnets 26, 30, 70, 72 have electrical servo-actuators 226, 230, 227, 231 for adjusting axial skew-angle $\alpha$, by pivoting the magnet relative to the vertical pivot axis, 27, 31, 127 and 131, respectively, to minimize the overhang of the magnet beyond the width of the levitation strips. The angle will be positive or negative depending on the direction of the curve in which the vehicle is traveling. The action of these servo-actuators thus minimizes the amount of reaction plate width needed to levitate the vehicle for a given thickness of reaction plate. An example of a suitable servo actuators comprises a fractional horsepower electric motor geared to a worm gear drive through a 400:1 ratio gearbox and have a 20 cm total travel with a response time of 200 milliseconds.

Each auxiliary primary thruster in a system of N thrusters has longitudinal dimension $\beta_1$ and spacing between adjacent primaries of P2 whereby the interval pitch is, $\beta_1+\beta_2=T_{pp}$ or the propulsion block pitch. Each primary is polyphase wound, and therefore each unit must be capable of producing approximately 1/N of the total vehicle thrust and 1/N of the lateral restoring force in the absence of main sidewall propulsion motors. Where the auxiliary primaries operate by induction and traveling wave action, as with the construction shown in FIG. 9, electrical efficiency will be increased by providing at least four electrical poles (p). However, there is a constraint on increasing the number of poles much beyond 4 due to the inverse relation of the primary pole pitch to the number of poles for a given block length. As the pole pitch is decreased beyond a certain limit by the increasing number of poles, the efficiency and power factor will be lowered as compared to normal for a given airgap operating condition. In general, it is a desirable design goal to seek to minimize the airgap to pole-pitch ratio.

Table 2 gives dimensions and design data for a full-size, 10.7 m long, 15.9 metric tons maglev vehicle guidance system incorporating groupings of 6 auxiliary motor thrusters per side and a system of 4 levitation magnets with skew angles appropriate for negotiating a horizontal radius which is as small as approximately 1.5 times the vehicle length. The optimum spacing of the auxiliary primaries to minimize the exit-edge effects among adjacent primaries is obtained by following the rule that $$\beta_2 = \tfrac{1}{2}\beta_1$$

Further the levitation magnet should be a longitudinal distance $\beta_3$ from the auxiliary motors whereby $$\beta_3 \approx 2\beta_1$$

and in general the excitation frequency to the levitation magnets will be different from the excitation frequency to the motor primaries.

TABLE 2

Typical Dimensions for 15.9 Metric Tons, 10.7 m Vehicle

Lateral Positioning Thrusters - Transverse Flux Motor

| | |
|---|---|
| No. per vehicle (dual system) | 12 |
| Longitudinal dimension, $\beta_1$ of active surface | 60.9 cm |
| Longitudinal internal spacing, $\beta_2$ | 30.48 cm |
| Active surface height | 21.6 cm |
| Reaction plate height | 28.6 cm |
| Reaction plate thickness | 0.96 cm |
| Reaction plate material | AL 6101-T64 |
| No. of motor poles/thruster | 4 |
| Pole pitch of primary winding | 15.24 cm |
| Airgap per side in straight section | 5.08 cm |
| Overall length of thruster grouping | 5.19 cm |

Conditions While at 9.1 m Radius Horizontal Curve

| | |
|---|---|
| Airgap per side - variation per thruster | 1.91–2.42 cm |
| Propulsion force per thruster | 7428 N |
| Surface propulsion force density | 0.576 kg/sq. cm |
| Active surface area per thruster | 0.14 sq. m. |
| Airgap field density | 0.855 Tesla |
| Lateral stiffness | $3.5 \times 10^6$ N/m |
| Frequency of lateral suspension | 1–2 Hz |
| Maximum skew angle of levitation magnet | 22° |
| Levitation magnet width/length | 25.4 cm/1.6 m |
| Distance between levitation magnet & thruster, $\beta_3$ | 1.15 m |
| Levitation magnet suspension height | 5.08 cm |
| Specific pressure loading/magnet | 0.976 kg/sq. cm |
| Excitation MMF per magnet | 120 kAT |

The choice of a transverse flux unit as opposed to longitudinal flux units permits variations of 20% in airgap without seriously affecting performance. In the interest of flexibility of control, each auxiliary primary has an independent phase delay power controller.

Figure 13:
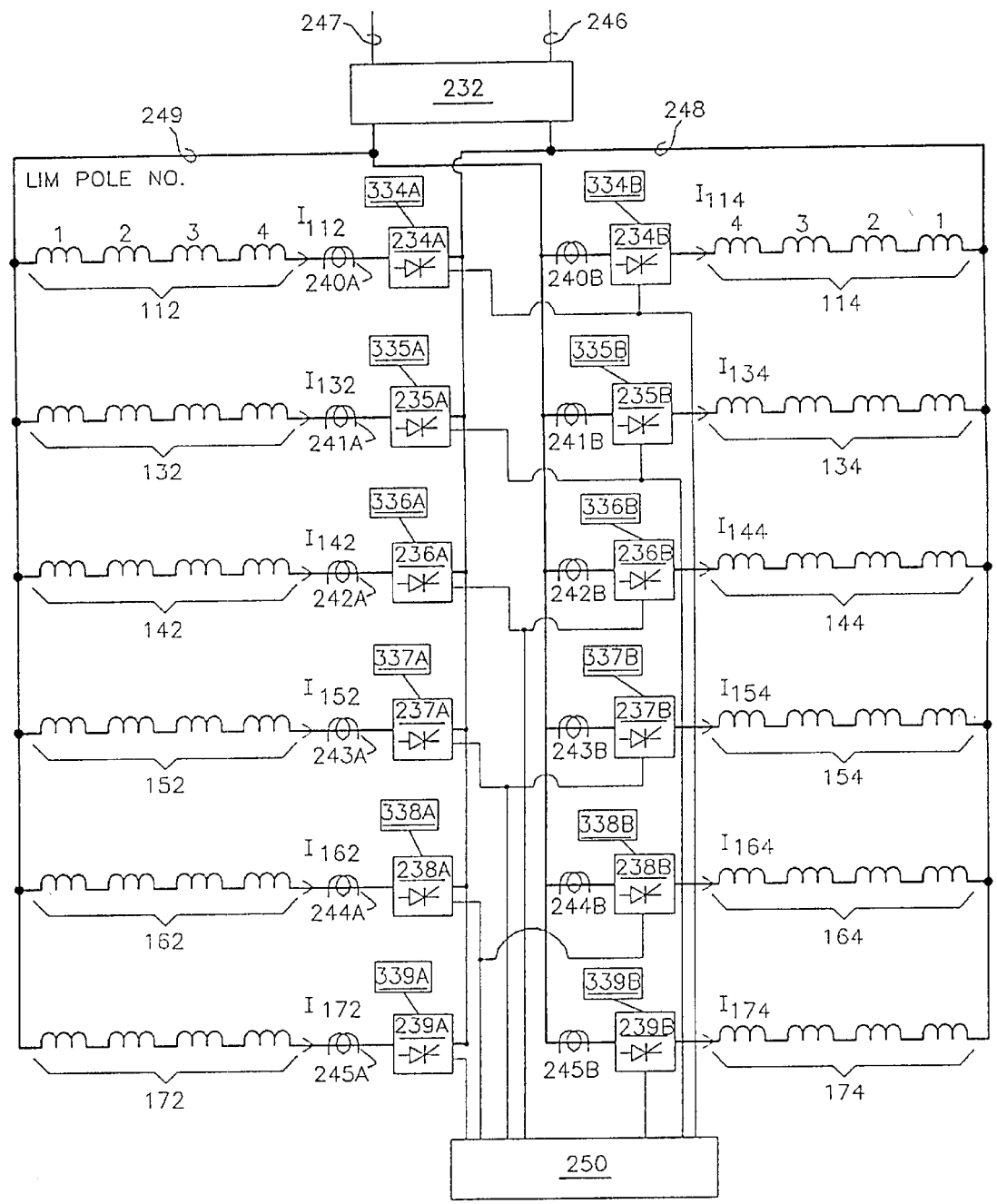
FIG. 13 is a layout illustration of the electrical schematic for controlling the auxiliary propulsion motors of the vehicle of FIG. 9.

FIG. 13 shows a schematic layout of the preferred electrical connection, for one phase in a polyphase system, for the dovetail thrusters of FIG. 11. The transverse flux primary units are fed by variable-frequency inverter 232 from alternating current input feeders 246, 247. The inverter output lines 248, 249 feed low-frequency AC to the right and left side primaries respectively. Each of the current paths I has a bilateral current regulator module 234A–239A, and 234B–239B, for the left and right hand side units, respectively, and instrumentation devices 240A–245A and 240B–245B for measuring the primary currents for use by a master current controller 250 in determining a gate-angle or thyristor firing schedule for the current regulators 234A–239A and 234B–239B.

The instrumentation devices 240A–245A and 240B–245B, for measuring the primary current may include an iron-core toroidal shaped current transformer having copper windings which produces an output current that is proportional to the line current of the motor lead passed through the center of the toroidal core. Alternatively, an air-core "Rogowski" conductive coil having a non-metallic, non-ferromagnetic toroidal core producing a voltage signal directly proportional to the line current may be employed. Also, through the use of a solid-state transducer having a gaped iron core forming an otherwise closed magnetic circuit, the Hall principle relating to semiconductors may be used to measure the line current in proportion to the magnetic field produced by the motor lead passing through the window of the magnetic core. Finally, a fixed-resistance, fixed-inductance current may be used to measure a voltage signal proportional to the line current passed directly through the shunt based upon the complex impedance of the shunt.

The master controller 250, which is a real-time feedback controller, then emits either optical or low-level electrical timing pulses, in response to the measured line currents, to the current regulator modules. Electrical integrating units 334A–339A and 334B–339B receive a magnetic field derived raw-signal voltage from airgap magnetic field sensors corresponding to each motor, for example the airgap sensors 188 for motor 112 and mathematically integrate the signal over time to produce a voltage signal proportional to the magnetic flux produced in the airgap. The proportional voltage signal is then multiplied as phasor quantity by the line current, as determined by the devices 240A–245A and 240B–245B to obtain the actual electromagnetic thrust which is produced by the associated auxiliary motor. The actual thrust produced by the auxiliary motor is then compared in an electrical comparator circuit with the command value of thrust originating from the controller 250 to determine the exact gating angle for the thyristor current controllers 234A–239A and 234B–239B for each phase of each auxiliary motor primary. The current regulator modules 234A–239A and 234B–239B may be insulated gate bipolar transistors (IGBT), MOS controlled thyristors (MCT), gate-turn-off thyristors (GTO) or power darlington transistors.

The motor primaries of the dovetail thrusters generate an electrodynamic repulsive force acting against the guideway mounted secondaries in addition to the thrust forces which are used to propel the vehicle. These repulsive forces can be useful in controlling the lateral position of the vehicle. FIG. 13A illustrates the relative RMS-current magnitudes in each of the dovetail motors which would tend to restore lateral position of the vehicle after translation of the entire vehicle to the left, which might occur for example in response to wind forces acting along the entire right side of the vehicle. The figure shows higher primary current in the left side motors in comparison with the current in the right side motors which would create an imbalance in the net lateral force exerted on the vehicle tending to restore the lateral position of the vehicle to the right towards a centered position within the guideway.

Figure 13B:
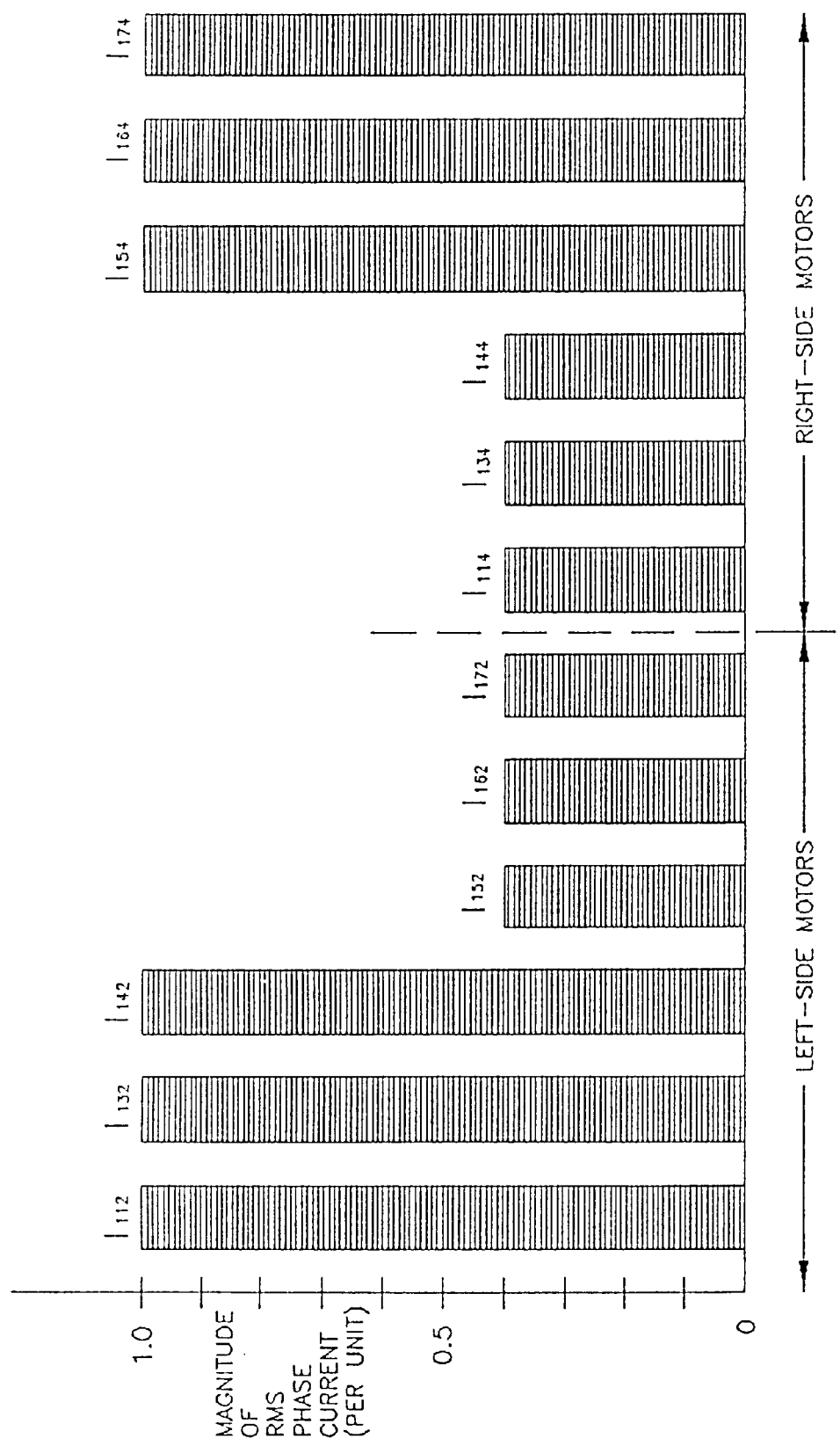
FIG. 13B is an illustration of the relative RMS-currents on the auxiliary motors of the vehicle of FIG. 9 which would create a force couple tending to restore angular positioning of the vehicle after rotation of the vehicle from external forces.

Turning to FIG. 13B, an RMS-current pattern is illustrated for repositioning of the vehicle in response to an applied moment tending to rotate the vehicle about a center point, such as might occur from a wind, or centrifugal, force acting only against the rearward half of the right side of the vehicle. Higher current is applied to the rearward left-side motors 112,132,142 and forward right-side motors 154,164,174 in comparison with the current applied to the forward left-side motors 152,162,172 and rearward right-side motors 114, 134,144. The resulting imbalanced repulsive forces will create a force couple tending to restore the vehicle in a counterclockwise direction, from the perspective of FIG. 11, in response to a clockwise rotation from wind, or other dynamic load, acting against the rearward half of the right side of the vehicle. The restoring moment is adjustable for both clockwise and counterclockwise force couples according to the current distribution among the multiplicity of motors.

Each individual primary has a series polyphase winding for optimum electrical efficiency and power factor. These units are variable frequency controlled from a common inverter power conditioner at a frequency of $$f=V_s*(1-\delta)/2T_p$$

where $T_p$ is the primary pole-pitch, $V_s$ is the synchronous speed and $\delta$ is the per unit electromagnetic slip. The preferred slip is approximately $$\delta=1/[n+1]$$

where n=number of primary poles. The number of primary poles for a typical small machine would be 4 and the slip would thus be ⅕ or 20 percent. In the main sidewall propulsion motors, the slip is held to under 10% to yield a high overall efficiency, however in the turning zones it is acceptable to have a higher slip since the amount of time in the turning zones is much less as compared to the straight or cruise sections. The main propulsion motor, having for example 11 poles, operates at a 9.1% slip and has a maximum secondary power transfer efficiency of 90.9%. In practice such a machine would have an 82–85% overall efficiency considering all other losses in the primary and track.

Figure 14A:
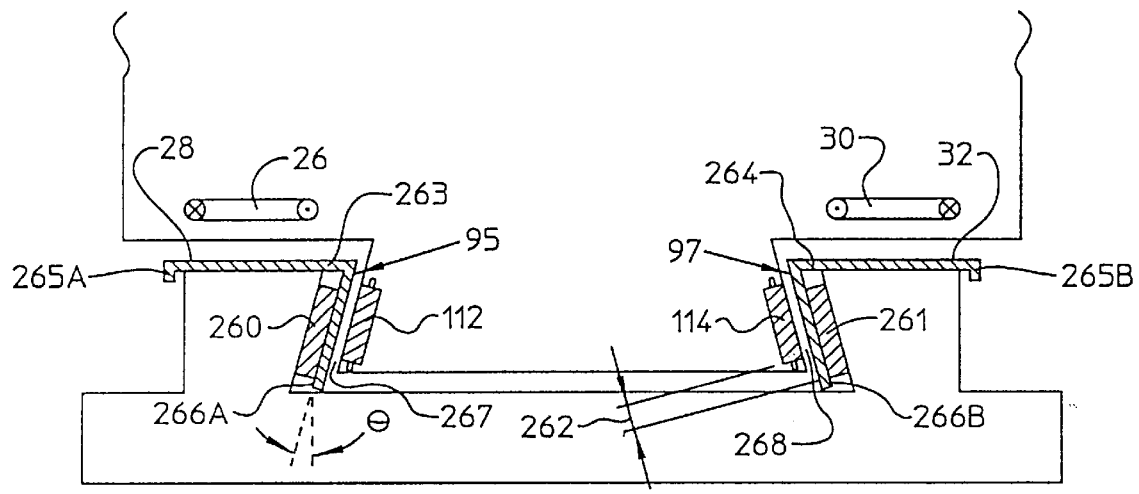
FIG. 14A–14H are partial elevational end views in section of the vehicle of FIG. 9, and associated guideway structure, showing alternate constructions for the magnetic components.

FIG. 14A shows a vehicle in which the levitation magnets 26, 30 include an air-core excitation coil. The system is called air-core due to the absence of ferromagnetic materials in both the primary and secondary magnetic circuits. The vehicle auxiliary propulsion dovetail thrusters 112, 114 interact with a secondary conductive plate 95, 97 having a ferromagnetic backing material 260, 261 forming a sandwich arrangement. The plate and backing material will have an orientation which is generally parallel with the dovetail angle, theta, of the auxiliary motor grouping. The airgaps 267, 268 which exist between the auxiliary thrusters 112, 114 and the conductive plates 95, 97 will be uniform along the transverse surface of the thrusters but will vary along the longitudinal length of the thrusters, as was discussed previously, when the vehicle encounters a curved guideway.

The thruster primaries 112, 114 are shown to be offset at an end with respect to the edge of the ferromagnetic backing material 260, 261 by offset dimension 262 such that the ferromagnetic core of the dovetail thruster primary unit 112, 114 is higher than the ferromagnetic backing 260, 261 of the secondary. This arrangement enhances the dynamic stability of the vehicle by providing a "shaded-pole" magnetic effect and a combination transverse-vertical restoring force which is attractive or tensioning in nature and which partially counteracts the repulsive force developed by the levitation magnet. This results in a measure of roll and heave stability.

The conductive plates on each side of the guideway are shown to be connected, thereby forming continuous L-shaped members 263, 264. The continuous member will accommodate the secondary electrical circuit for the induced currents from the levitation magnet as well as the induced currents from the dovetail thruster, although the frequencies of induced currents will not necessarily be equal. The L-shaped member 263, 264 includes electromagnetic flux induced current return portions 265A, 265B extending from an end of conductor plates 28, 32 and overhanging portions 266A, 266B extending from the auxiliary propulsion conductor plate 95, 97 beyond an end of the ferromagnetic material 260, 261. That portion of each of L-shaped members 263, 264 which excludes return portion 265A, 265B and overhanging portion 266A, 266B may be termed the "active zone" for the magnetic fluxes generated by the component systems.

Figure 14B:
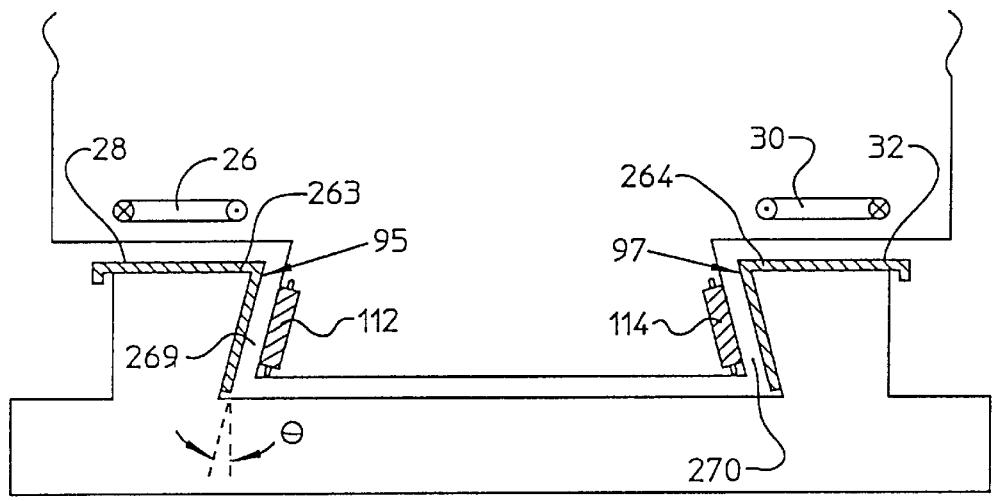

The arrangement shown in FIG. 14B is similar to the arrangement of FIG. 14A except that the ferromagnetic backing material 260, 261 has been removed. The airgaps 269, 270 will be uniform along the transverse length of the thrusters as were the airgaps 267, 268 for the FIG. 14A arrangement but in general will be larger in size than airgaps 267, 268.

Figure 14C:
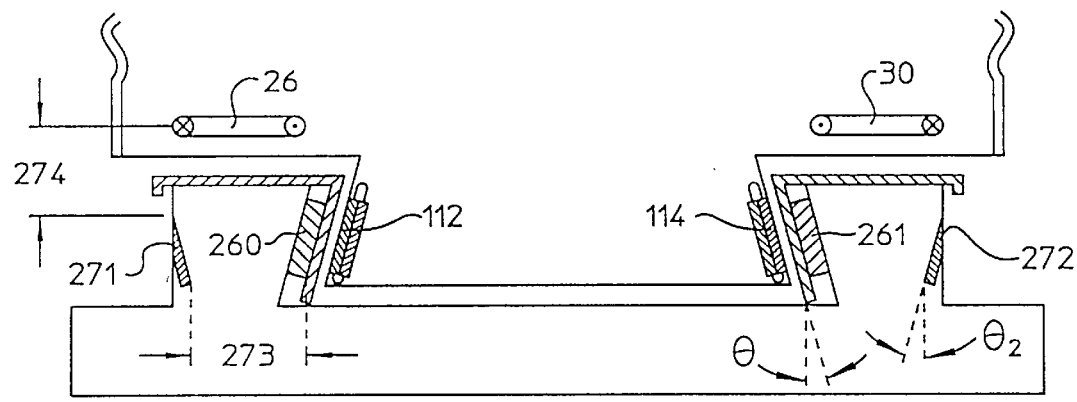

FIG. 14C shows a modification of the arrangement of FIG. 14A wherein a flux return plate 271, 272 is embedded in the guideway and is orientated at angle (theta-2) with respect to vertical in an opposing relation to the orientation angle (theta) of the auxiliary propulsion ferromagnetic backing material 260, 261. Each additional flux return plate 271, 272 is placed such that lateral spacing 273 is less than the vertical dimension 274 which will exist between the coil of levitation magnets 26, 30 and an edge of the flux return plate. The plates 271 and 272 are also placed with respect to 260 and 261, respectively, so that plates 260, 271 and 261, 272 are to be symmetrically located with respect to the vertical axes passing through the centers of the levitation magnets. The additional plate serves to improve the symmetry and increase the magnitude of the magnetic flux path emanating from the main levitation magnets 26, 32 and crossing the airgap. It is clear that the ferromagnetic material 260, 261 will share magnetic flux from both the levitation magnet and the dovetail thruster. However, these two fluxes will generally be at substantially differing frequencies and will be concentrated in different magnetic planes. Therefore, the two fluxes will not materially interfere with each other in their respective functions.

Figure 14D:
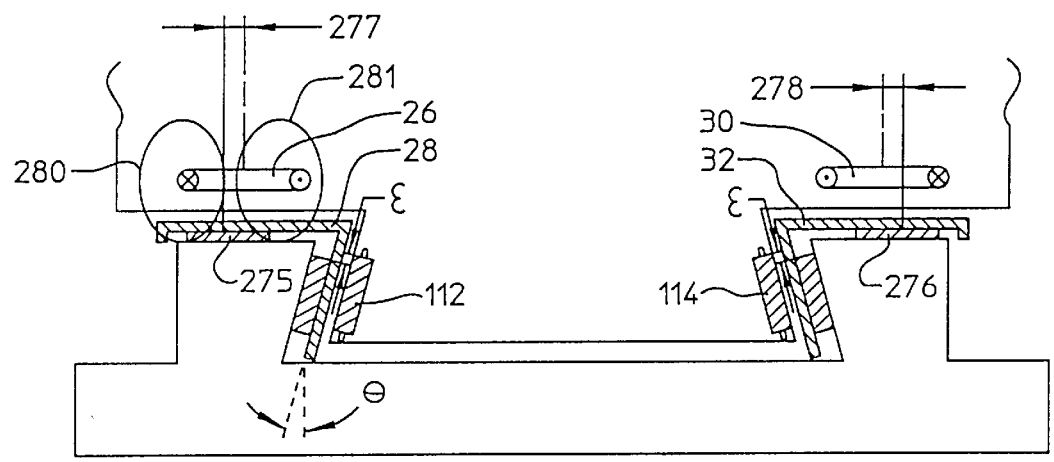

In the arrangement shown in FIG. 14D, the guideway upper conductive plate 28, 32 is augmented by a ferromagnetic return plate 275, 276 in a sandwich configuration with the return plates 275, 276 being positioned between the conductive plates 28, 32 and the guideway. The return plates 275, 276 serve to confine the magnetic flux of the levitation magnets to the upper surface and thereby reduce stray magnetic fields. The return plates 275, 276 are offset laterally toward the outside of the guideway with respect to a centerline of the levitation magnets by a distance 277, 278 for the purpose of creating a higher lateral restoring force for centering the vehicle with respect to the guideway. This arrangement also enhances the yaw stability and sway stability of the vehicle under dynamic conditions or external forces acting on the vehicle body. Representative magnetic flux lines 280, 281 from the levitation magnets are included to show the effect of the magnetic return plates. The dovetail thruster primary 112, 114 shown in FIG. 14D may be one of the following electrical machine types:

1. longitudinal flux linear induction motor
2. transverse flux linear induction motor
3. reluctance type linear synchronous motor
4. permanent magnet linear synchronous motor
5. wound-field linear synchronous motor For types 1 and 2 the secondaries would be limited to a conductive plate or conductive grid having an associated ferromagnetic return member. For type 3, the secondary would include a conductive grid acting as a synchronous machine damper winding with a segmented ferromagnetic return member designed to create large, reoccurring spatial differences in magnetic reluctance as a function of longitudinal displacement. For type 4, the secondary would include a conductive grid acting as a synchronous machine damper winding with an interposed or subsurface member comprised of a series of permanent magnets of alternating polarity and spaced longitudinally along the guideway. The type 5 system has a wound-conductor secondary which is externally excited by a direct current supply and produces an alternating pattern of north and south magnetic poles, with a performance characteristic which includes both a repulsive and propulsive force independently controlled by the pole angle established by the primary power supply. The choice of the primary member type will be based on system considerations but it is clear that the selection of a dovetail thruster machine primary type allows a corresponding change in secondary member and that the advantages offered by the dovetail layout apply to a wide variety of electrical linear propulsion machines of both synchronous and asynchronous type.

Figure 14E:
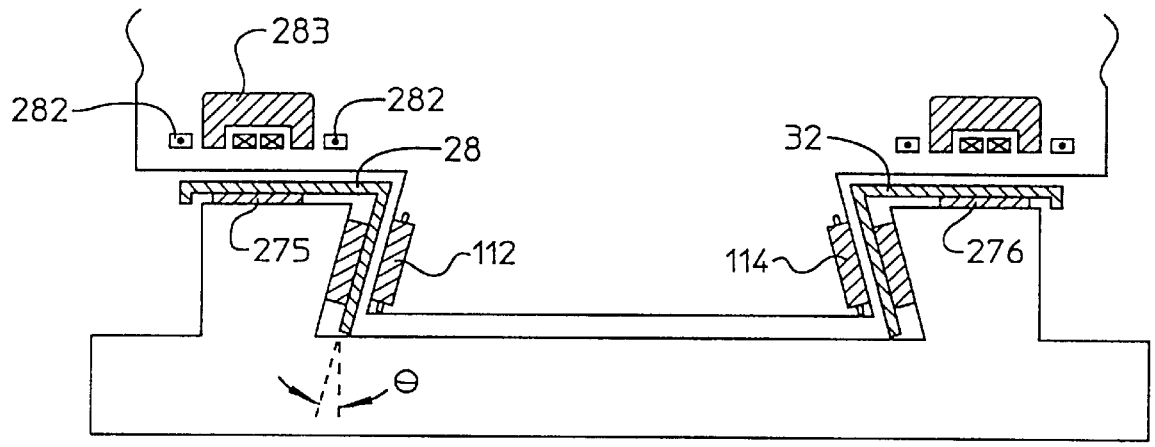

Turning to FIG. 14E, the arrangement shown is similar to the arrangement of FIG. 14D except that each of levitation magnets 26, 30 includes a C-core transverse flux magnet primary unit composed of two excitation coils 282 and a ferromagnetic C-core 283. Both FIGS. 14D and 14E show an arrangement that minimizes the magnetic coupling and magnetic interference between the levitation system and the auxiliary propulsion thrusters. This is accomplished by the specific insertion of a ferromagnetic return plate 275, 276 on the upper surface of the guideway which completes the magnetic circuit of each levitation magnet and minimizes the stray magnetic field impinging on the auxiliary propulsion system. As shown in FIG. 14E, the width of the associated guideway ferromagnetic return plate 275, 276 is sized in transverse width to be equal to or slightly less than the transverse width of the C-core 283. Thus the width of the ferromagnetic return plate is not greater than the width of the C-core. With this construction, there can be no lateral offset to the positioning of the ferromagnetic return plate with respect to the levitation magnet, thus resulting in a design with no shaded-pole effect and with symmetrical magnetic flux in the airgap about the center-line of the magnet.

Figure 14F:
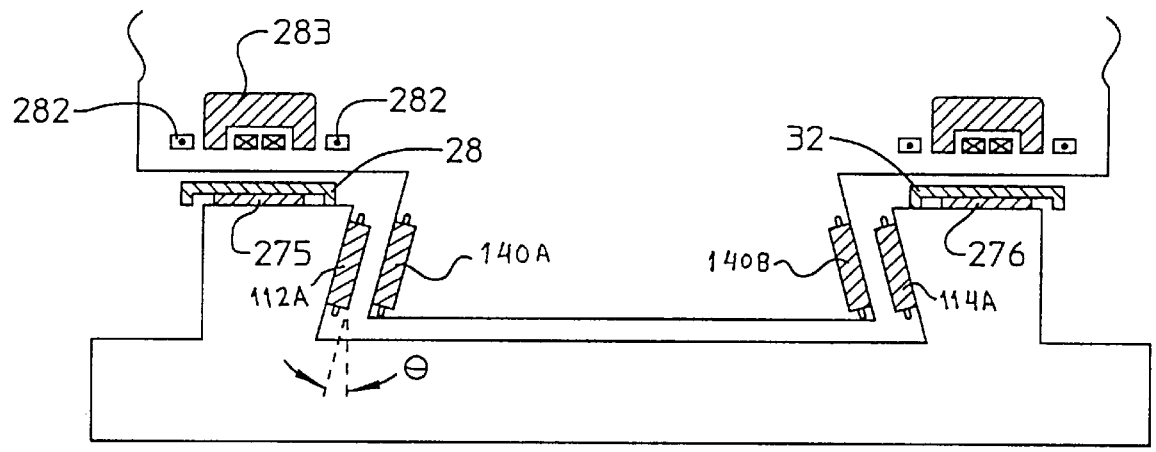

FIG. 14F shows a modification which includes a linear synchronous motor primary 140A, 140B and a guideway sidewall mounted member which consists of a wound-field structure 112A, 114A having separate excitation, usually direct current, to form the secondary electrical member. This system requires a position feedback signal derived from a measurement of the wound-field structure electrical angle to determine the pole or thrust angle of the linear synchronous motor primary. It has the advantage of efficiently working over a larger lateral airgap as compared with a linear induction motor of the same size. In an alternate embodiment, vehicle member 140A, 140B may be a low-power wound-field structure, DC-excited, and the guideway may contain the AC-excited primary structure thereby avoiding the transfer of high power to the vehicle in using guideway mounted power conditioning apparatus to power the primaries.

Figure 14G:
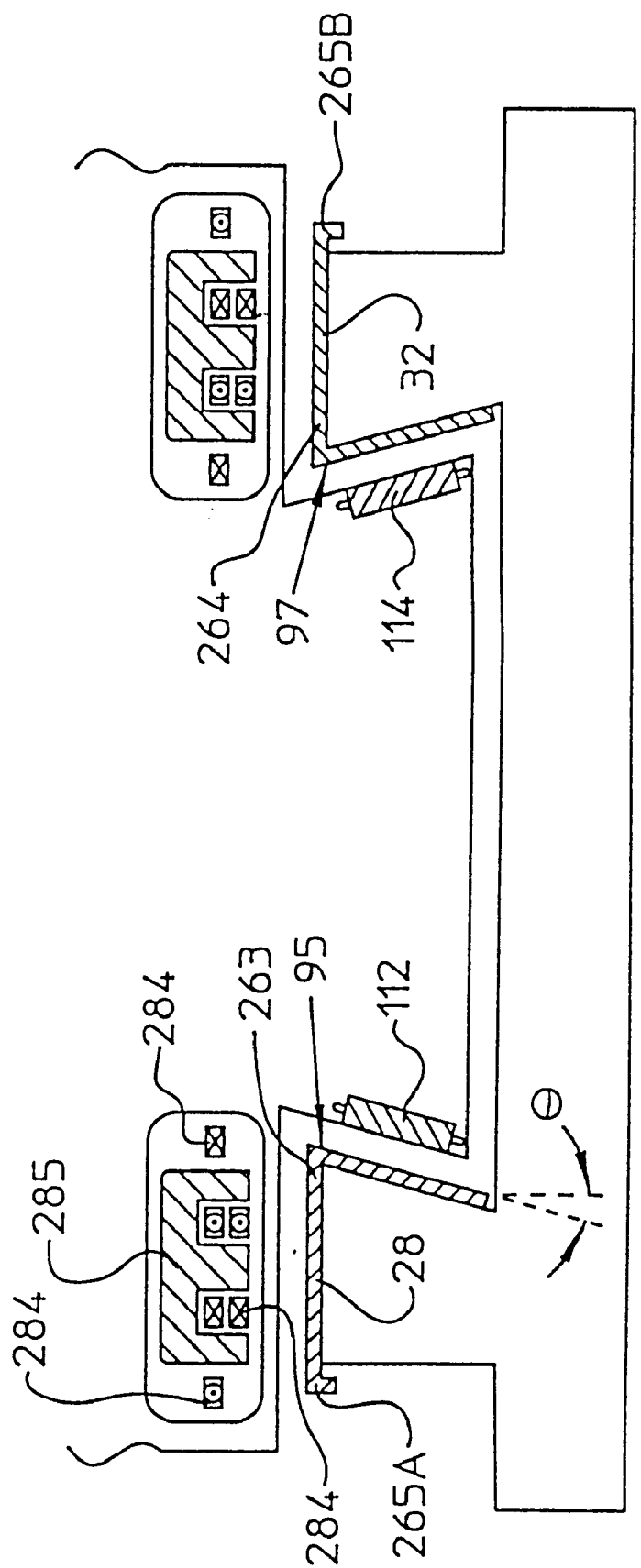

FIG. 14G shows an arrangement wherein the levitation magnet is of the E-core type comprising three excitation coils 284 and a ferromagnetic, laminated E-shaped primary core 285. This arrangement is particularly useful when the levitation magnet is spatially separated along the vehicle length from the auxiliary propulsion system. The coils 284 may be superconducting, cryogenic aluminum or liquid cooled high current-density electrically conductive coils having the ability to carry alternating current in the low frequency range. The figure shows that the end of the L-shaped conductor 263, 264 containing the return portion 265A, 265B extends beyond the magnetic core 285. The conductor 263, 264 have a cross-sectional area to carry, in addition to its main induced current, an induced current at the opposite edges of the conductive plate having about the same current loading as the primary coils 284 or alternately have approximately the same electrical surface impedance. The return portion 265A, 265B also serve a mechanical function by sealing the guideway surface cap from environmental elements and as well laterally restraining the auxiliary propulsion conductor 95, 97 against electromagnetic force induced movement. In the arrangement shown in FIG. 14G both the levitation magnets and dovetail thrusters have secondaries representing "open magnetic circuits" in that the secondaries have no ferromagnetic material. It is clear that the exact form of the dovetail thruster primary unit includes a choice among two broad types of linear induction motors (detailed above in the description of FIG. 14D) or a wound-field linear synchronous motor wherein the secondary includes a grouping of electrical DC-excited conductors forming periodic north and south magnetic poles.

Figure 14H:
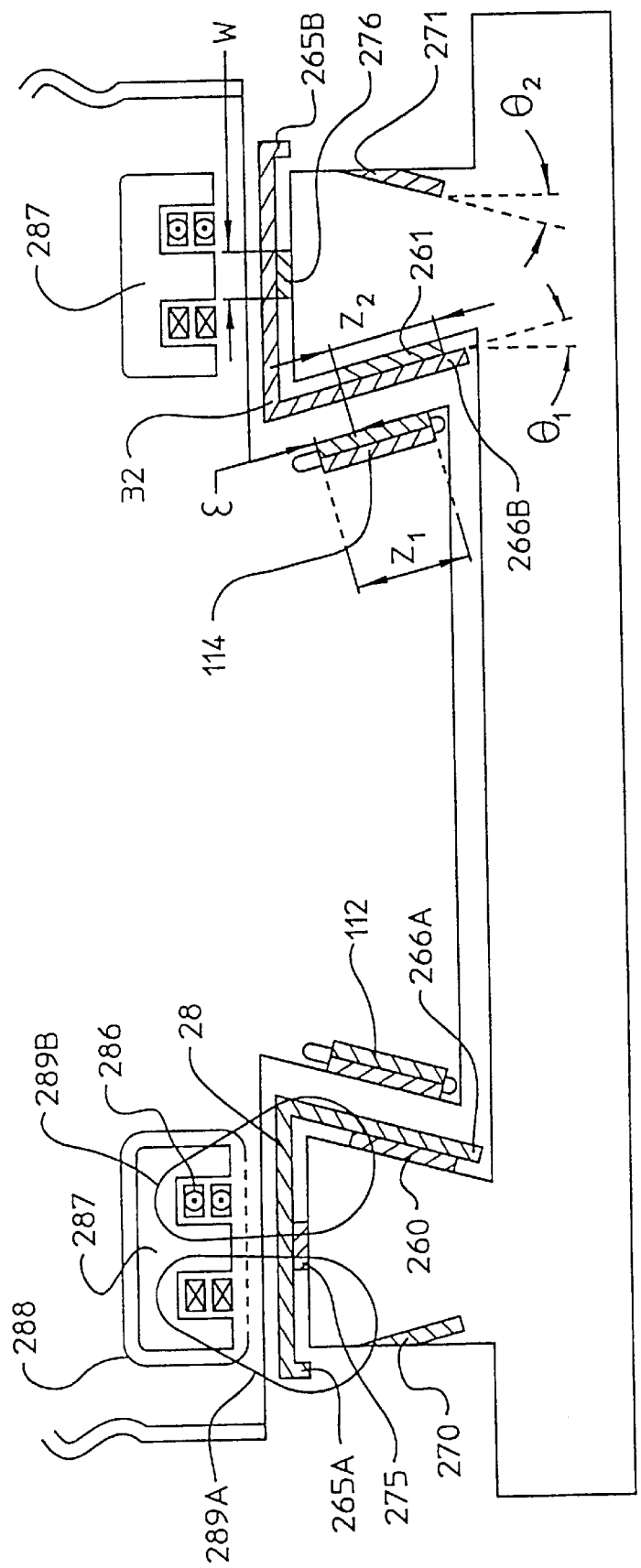

The arrangement shown in FIG. 14H includes all of the ferromagnetic components for the secondary members including backing material 260, 261, flux return plates 271, 270 and magnetic return plates 275, 276. The levitation magnet primary is an E-core type transverse flux magnet having two excitation coils 286 surrounded by E-shaped magnetic core 287. The primary is shown contained within enclosure 288 which in the case of a superconducting magnet is a cryostat or other suitable cryogenic vessel. Flux lines 289A and 289B are shown to link the ferromagnetic components on either side of the guideway structure to form individual magnetic circuits. As was done in the arrangement of FIG. 14C, the ferromagnetic backing material 260, 261 and ferromagnetic flux return plates 275, 276 are positioned to be symmetrical with respect to a vertical axis running through the center of the levitation magnets. The transverse widths of the auxiliary thruster and the corresponding ferromagnetic backing material, Z1 and Z2 respectively, are shown to be approximately equal and incorporate the stabilizing offset, epsilon, to improve roll and heave stability, as was discussed previously. The ferromagnetic return plates 275, 276 are sized to have a transverse dimension, W, which is equal to, or greater than, the width of the opposing center limb of the E-core 287. The orientation angles theta-1 and theta-2 of the ferromagnetic backing material and the corresponding flux return plate, respectively, although opposite in direction, will be of substantially the same magnitude. The return portions 265A, 265B and overhang portions 266A, 266B of the L-shaped conductors 263, 264 serve to improve electrical efficiency and maximize the lift or propulsion per ampere-turn of excitation.

Figure 15:
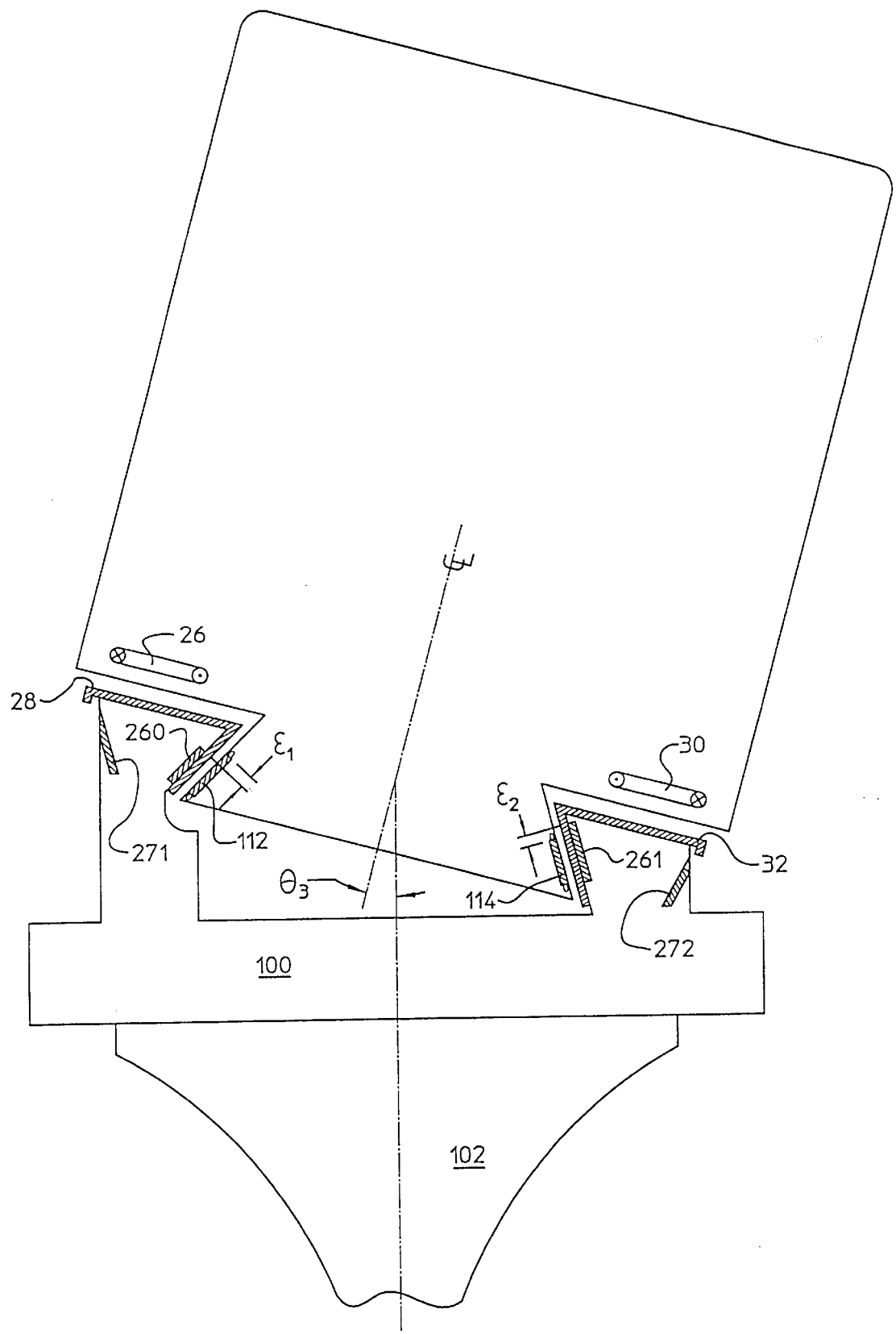
FIG. 15 is an elevational view in section of a superelevated guideway structure.

FIG. 15 shows a vehicle having the groupings of auxiliary motor primaries deployed in the dovetail position encountering a banked section of the guideway. The guideway is shown to be superelevated at angle (theta-$\theta_3$) equal to 15 degrees, and the guideway sidewalls have been removed to accommodate the banking of the vehicle. The figure shows an electromagnetic arrangement which includes features shown in FIG. 14C and also includes an electromagnetic offset, epsilon, between the upper end of the auxiliary thruster primaries and the upper end of the guideway secondary ferromagnetic backing material, a feature which was discussed above in conjunction with FIG. 14A. However, as shown in FIG. 15, in a banked curve, the offset ε1 for the left side thruster 112 is opposite in sign from offset ε2 for the right side thruster 114 in that the left side primary extends beyond the end of the backing material 260 (a positive offset) while the upper end of the right side backing material 261 extends beyond the upper end of the right side primary (a negative offset). The use of opposing signs for the left and right side offsets in banked turns produces a roll torque on the vehicle which tends to counteract the forces imposed on the vehicle in the banked turns from the centrifugal forces.

Figure 16:
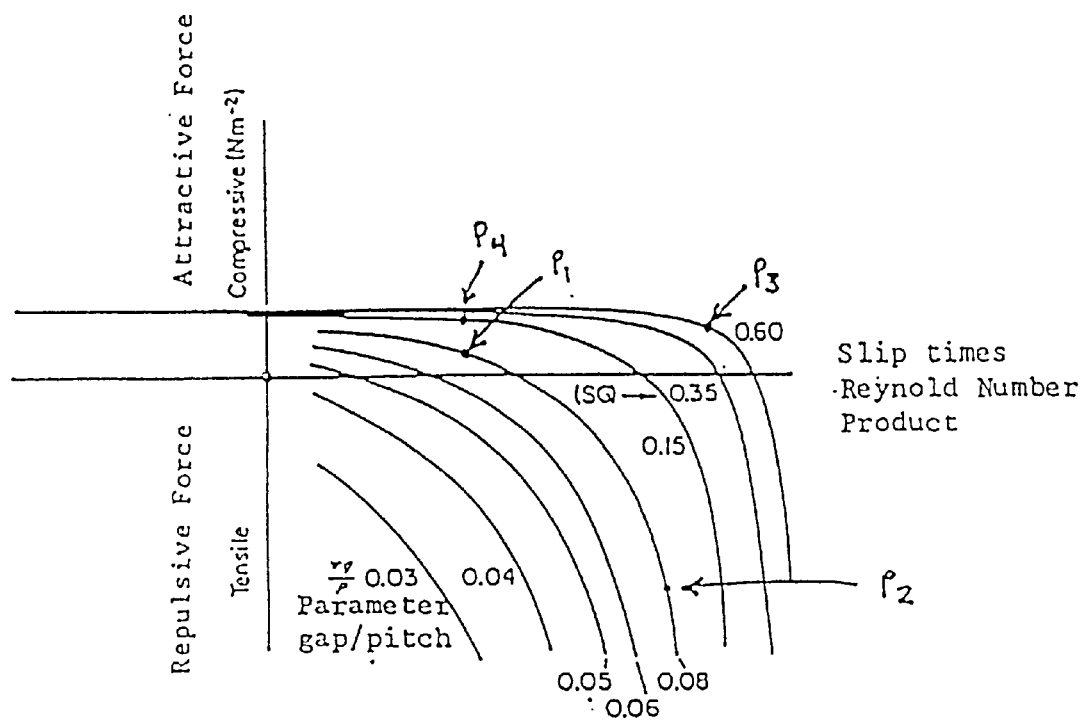
FIG. 16 is a set of curves of attractive and repulsive normal forces for a linear induction, longitudinal or transverse, flux motor.

The characteristic curves of attractive and repulsive normal forces for a linear induction longitudinal, or transverse, flux machine is shown in FIG. 16. The abscissa for the curves is the product of magnetic Reynolds number, G and electromagnetic slip. The figure shows eight curves representing the parameter π×airgap/pole-pitch and ranging from 0.03 per unit to 0.60 per unit. Larger machines operate in the range of 0.03 p.u. to 0.08 p.u., whereas smaller machines generally operate in the range 0.08 to 0.60 p.u. Operating Point $P_1$ is a low-slip condition on the π g/p curve of 0.08 p.u., having a net attractive normal force, i.e. the vehicle is being attracted to the guideway magnetic strip secondary. At Point $P_2$, which represents a high-slip condition along the same curve, the net normal force is repulsive-electrodynamic which occurs without change of any physical dimensions. As an option to increasing the slip, the same effect of changing from attractive to repulsive mode can be achieved by increasing the excitation frequency to the primary winding, thereby linearly increasing the Reynolds number while maintaining the slip at a preferred constant value. This option may be desirable as the slip value is normally a low value to maintain optimum efficiency.

The same set of curves of FIG. 16 can be used to predict the linear induction longitudinal, or transverse, flux machine performance where a constant frequency and constant slip are maintained, and are applicable to either the main or auxiliary propulsion motors, with appropriate Reynolds numbers specific to each type. Under these conditions, changes to the vehicle-guideway airgap will result in a shift from one curve to another. For example, an increase to the airgap by a factor of 1.8 per unit will result in a change from the 0.08 line to the 0.15 line and the Reynolds number would be reduced to one-half of the previous value. If the previous operating point had been $P_2$ in the repulsive quadrant, the new operating point will be $P_4$ in the attractive quadrant with the larger gap. This switch from repulsion to attraction represents a self-restoring normal force characteristic which can be rapidly controlled by control over the inverter frequency for a given design.

Figure 17:
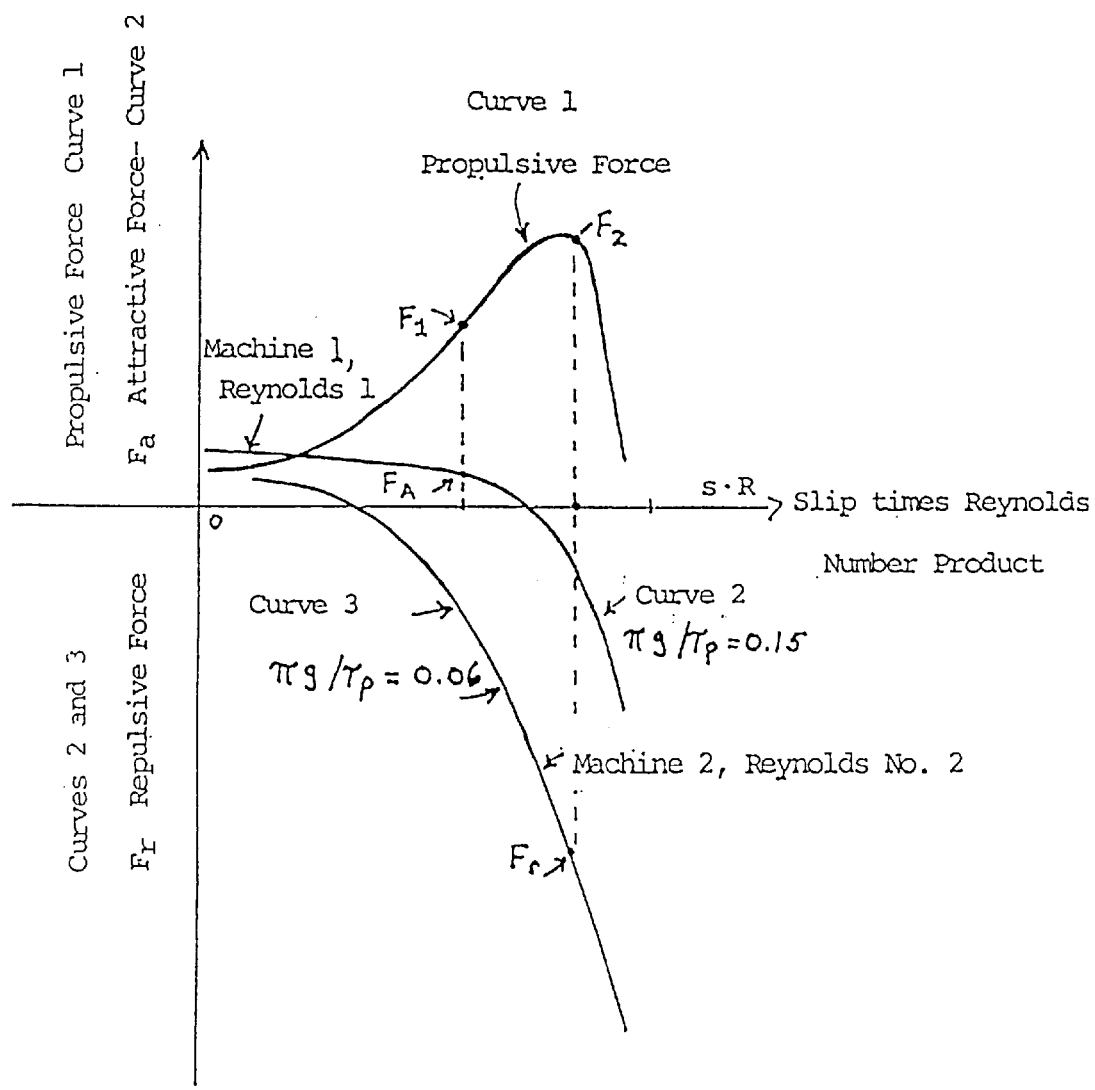
FIG. 17 is a set of curves showing the propulsion and repulsion force characteristics of a linear induction motor.

The propulsion motors carried by the vehicle including the main sidewall propulsion motors 22, 24, 122 and 124, as well as auxiliary dovetail primaries could be single sided linear induction motors (LIM) or single sided linear synchronous motors. Double-sided LIMs are also applicable and would have the same basic force characteristics as seen in FIG. 16. In the case of LIMs, the corresponding secondary carried by the guideway may include a conductive plate including an optional ferromagnetic backing plate. Alternatively, a conductive ladder, as more fully described in my U.S. Pat. No. 5,433,149, could be included in place of a conductive plate. The propulsive and repulsive characteristics of a LIM are shown in FIG. 17 where it may be seen that two identically constructed motors can have the same propulsive force while exhibiting different repulsive forces. Assuming two motors 1 and 2 with motor 1 subjected to the larger airgap, then the resulting Reynolds number for motor 1 will be smaller than for motor 2, since the value of the magnetic Reynolds number is inversely proportional to the size of the airgap. As seen in FIG. 17, the electrodynamic-normal force for motor 1 is found to be on curve 2, representing points of π * airgap/pole-pitch=0.15 per unit corresponding to motor 1 conditions. This force is actually an attractive force, Fa. The repulsive force for motor 2 require a shift to curve 3, representing points of Pi * airgap/pole-pitch=0.06 due to the smaller airgap imposed on motor 2, and is seen to be repulsive force Fr.

Figure 18:
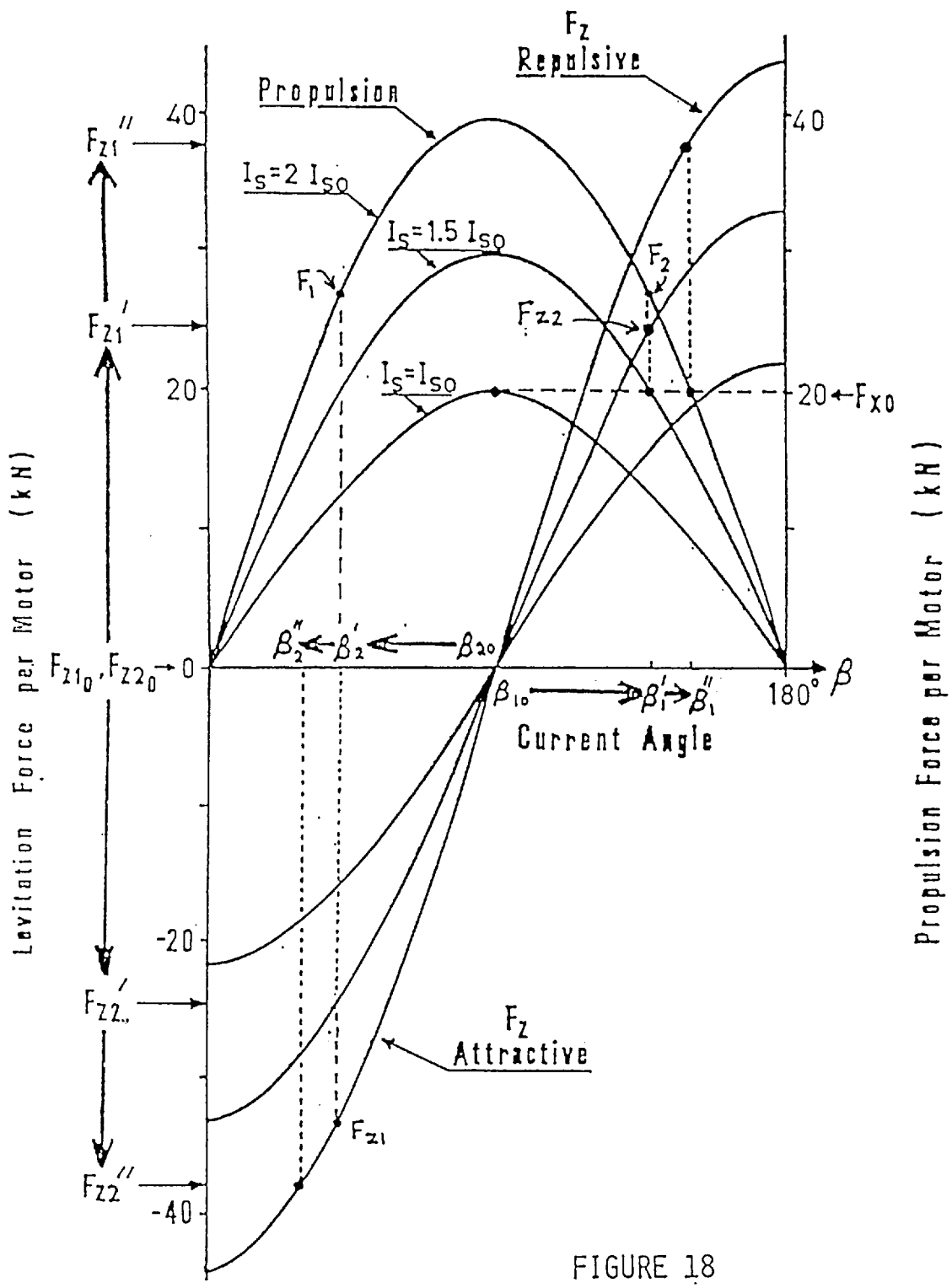
FIG. 18 is a set of curves showing the propulsion and repulsion force characteristics of a linear synchronous motor.

In the case of a linear synchronous motor, the secondary member carried by the guideway will typically be an externally-excited grouping of DC field coils arranged in an alternating polarity, per se well known in the art. These machines will exhibit propulsion and repulsion force characteristics as shown in FIG. 18 where the forces are plotted versus the inverter "current angle" (Beta-β). The figure shows three curves representing three different stator excitation levels and shows that, similar to the case of a linear induction motor, the linear synchronous motor can exhibit widely varying repulsive forces while providing equal propulsion forces.

Figure 19:
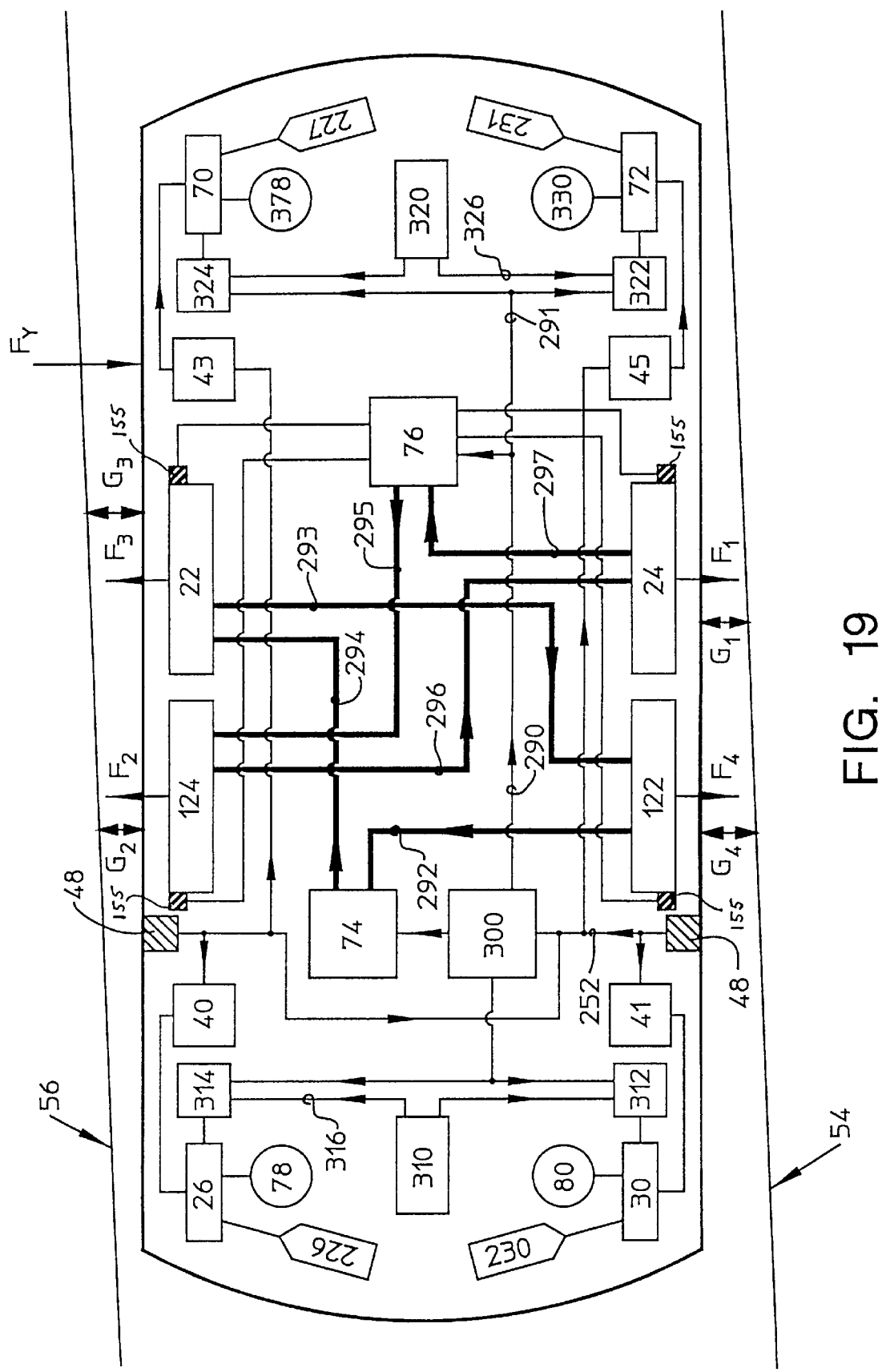
FIG. 19 is a layout illustration of major elements, and the power supply connections, for a magnetically levitated vehicle according to the present invention.

FIG. 19 shows a plan view of a maglev vehicle undercarriage equipment compartment. The arrangement shown includes four independent levitation magnets 26, 30, 70, 72 and four cross-coupled propulsion motors 22, 24, 122, 124. Each propulsion motor has associated with it an airgap proximity transducer 155. Each of the levitation magnets has identical support systems for electrical power and cryogenic support. The levitation magnets 26, 30, 70 and 72 are connected to cryogen reservoirs 78, 80, 378 and 330, respectively, and are able to swivel in the horizontal plane through swivel actuators 226, 230, 227 and 231, respectively, which optimize the alignment of the magnets in the curved sections with the corresponding reaction conductors mounted on the guideway. Cryogenic support systems 40, 41, 43, and 45 for the magnets include a refrigerator or liquefier, typically for either liquid helium or liquid nitrogen supply as well as associated pressure, flow rate and temperature regulators. The cryogenic support systems are electrically powered from the AC polyphase input collector 48. The magnets are electrically powered by variable frequency inverters 314, 312, 324 and 322 which provide low frequency AC power. The inverters receive direct current from the main rectifier/converter and input polyphase filter 300. Alternatively, the inverters receive direct current from battery back-up supplies 310 and 320 when power is unavailable from collector 48 such as in pivot turns. The batteries are located at opposite ends of the vehicle and each supplies the inverters located at a particular end of the vehicle via lines, such as line 316 for inverter 314 and line 326 for inverter 322. Under the majority of operating conditions, however, the rectifier and filter 300 will have a constant frequency polyphase input for total vehicle power needs supplied by the guideway power rails via collector 48 and line 252. In the arrangement shown, the inverters 322 and 324 are located at the opposite end of the vehicle from rectifier and filter 300 but are connected via line 290, and 291. Input switch gear and fusible protection is also contained in Unit 300.

The arrangement shown in FIG. 19 provides for a regenerative power flow path from the levitation magnets back to the AC input line through collector 48 such that if the vehicle experiences transient vertical motions such as heave, the stored energy of each magnet is returned back to the AC line rather than being dissipated locally within the magnet, resulting in a more efficient design and reducing the possibility of a levitation magnet quench or malfunction. Additionally, in strong surge or pitch motions, there will be additional energy transferred within the magnet coils which may be returned to the system source generator via this regenerative power link.

Rectifier and filter 300 provides a second-stage of high power rectification and powers the propulsion variable frequency inverters 74, 76. In the cross-coupling arrangement shown in FIG. 20, inverter 74 powers linear propulsion motors 22 and 122 which are connected in series through power lines 292, 293, and 294 for the primary windings on each phase. Similarly, inverter 76 powers linear propulsion motors 24 and 124 which are connected in series through power lines 295, 296, 297 for the primary winding groups on each phase. As described previously, the cross-coupling arrangement allows for nearly constant propulsion power as the vehicle encounters sway motions, such as from wind loading, which tends to increase the airgap associated with one of the coupled motors while decreasing the airgap associated with the other of the coupled motors. The cross coupled arrangement of independent sets of propulsion motors also allows for varying the repulsive force of one set of motors versus the other. For example, forces F1 and F2 can be adjusted to exceed forces F3 and F4, by changing the excitation or changing the slip value, as described previously, in order to provide a restoring force couple to the vehicle in response to yaw moment applied to the vehicle from a force Fy such as might be placed on the vehicle by wind loading. Preferably inverters 74 and 76 will be coordinated such that equal propulsive force is developed among all four motors even as the repulsive force is being modified to respond to such a yaw moment.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

I claim:

1. A transportation system for levitated propulsion of a vehicle relative to a guideway having first sections for linear vehicle travel and second sections for turning movements of the vehicle, the system including:
   (a) dynamoelectric machines operative in response to alternating current excitation to generate fields of magnetic flux for electrodynamically levitating and guiding said vehicle along the first and second sections of the guideway and for electrodynamic propulsion of the vehicle along the first sections of the guideway; and
   (b) auxiliary dynamoelectric machines operative in response to alternating current to generate fields of magnetic flux for electrodynamic propulsion of the vehicle along said second sections of the guideway.

2. The transportation system according to claim 1 wherein said dynamoelectric machines for electrodynamic propulsion comprise linear induction transverse flux machines and wherein said system further includes variable frequency power controller for changing the excitation frequency to primary windings of said transverse flux machines to linearly change a magnetic Reynolds number while maintaining an electromagnetic slip at a preferred constant value.

3. The transportation system according to claim 1 further including at least one null flux loop proximate to said second sections, controllers for establishing a differential current generated at one side of the loop which is distinct from the current generated in the opposite side of the loop creating asymmetrical electrodynamic forces for executing turning movements of the vehicle.

4. The transportation system according to claim 1 further including a central vertical pivot axis defined by a pivot connected to each of said dynamoelectric machine for electrodynamically levitating said vehicle and an actuator secured eccentrically to said pivot axis for pivotally positioning the dynamoelectric machine associated therewith.

5. A transportation system according to claim 1 further including a current regulator for each of a plurality of primaries comprising said auxiliary dynamoelectric machines, and a master current controller operatively connected to each of said current regulators for controlling an electrodynamic repulsive force acting in addition to a thrust force against the guideway mounted secondary electrical members for enhancing the lateral stability of the vehicle.

6. The transportation system according to claim 1 wherein said second sections of the guideway include at least one track switching area having diverging paths of travel for the vehicle and wherein said auxiliary dynamoelectric machines include:
   (a) diverging sequential and horizontally spaced guideway mounted primary electrical members along each of the diverging paths for generating diverging said fields of magnetic flux; and
   (b) vehicle mounted secondary electrical members responsive to the fields of magnetic flux of said guideway mounted primary electrical members for said propulsion of the vehicle.

7. The transportation system according to claim 6 further including guideway mounted secondary electrical members responsive to magnetic flux for electrodynamically levitating and guiding and at least one guideway mounted null flux loop in said switching area and wherein said guideway primary electrical members are flush with the secondary electrical members and the null flux guidance loop.

8. The transportation system according to claim 6 wherein the guideway mounted primary electrical members consist of linear induction motors and wherein said vehicle mounted secondary electrical members includes electrically conductive members having a ferromagnetic backing member.

9. The transportation system according to claim 6 further including at least one guideway mounted guidance member for laterally guiding the vehicle into one of the diverging paths of the track switching area.

10. The transportation system according to claim 9 wherein the guideway mounted guidance member includes at least one null flux loop responsive to said magnetic flux for producing a controllable electrodynamic lateral force.

11. The transportation system according to claim 10 wherein the guidance member further includes switching for controlling the induced current within the null flux loop such that a current may be generated in a left side of the loop which is distinct from a current in a right side of the loop.

12. The transportation system according to claim 1 wherein said second sections of the guideway include at least one pivot turning zone and wherein said auxiliary dynamoelectric machines include:
   (a) guideway mounted primary electrical members for generating said fields of magnetic flux; and
   (b) vehicle mounted secondary electrical members responsive to said guideway mounted primary electrical members for pivoting of the vehicle within the pivot turning zone and for propulsion of the vehicle into and out of the pivot turning zone.

13. The transportation system according to claim 12 wherein the guideway mounted primary electrical members include an axial flux motor and the vehicle mounted secondary electrical members include a conductive plate responsive to said axial flux motor for said pivoting of the vehicle within the pivot turning zone.

14. The transportation system according to claim 12 wherein the guideway mounted primary electrical members include transverse flux motors and the vehicle mounted secondary electrical members include a conductive strip responsive to said transverse flux motors for said propulsion of the vehicle into and out of the pivot turning zone.

15. The transportation system according to claim 1 wherein said auxiliary dynamoelectric machines include:
elongated secondary electrical members each operative with a plurality of primary electrical members for establishing fields of magnetic flux at spaced apart locations in the direction of the length of the vehicle for propulsion of the vehicle along said second sections.

16. The transportation system according to claim 15 further including a central vertical pivot axis defined by a pivot connected to each of said auxiliary dynamoelectric machines for electrodynamically levitating said vehicle and an actuator secured eccentrically to said pivot axis for pivotally positioning the auxiliary dynamoelectric machines associated therewith.

17. The transportation system according to claim 15 wherein the primary electrical members are transverse flux motors mounted on the vehicle and the secondary electrical members are carried by the guideway, and wherein said guideway includes a dovetail trough extending longitudinally throughout the entire length of said second sections, said trough having a floor bounded at opposite lateral sides by acutely angled sidewalls orientated so as to establish an undercut relation with respect to a planar upper surface of the guideway.

18. The transportation system according to claim 17 wherein the vehicle includes at least a pair of motor support frames each supporting one of said primary electrical members and oppositely located from one another with respect to a vehicle centerline, the frames pivotable between a first position in which the primary electrical members are located within the vehicle undercarriage and a second position in which the primary electrical members extend from the vehicle undercarriage in a generally parallel orientation with respect to said secondary electrical members, the primary electrical members when positioned in said second position controlling the vehicle to limit and damp vertical motion in the presence of electromagnetic forces and in a failure mode through a mechanical wedging effect preventing the vehicle from disengaging from the guideway.

19. The transportation system according to claim 18 wherein the vehicle includes a pair of sensors attached to each of said frames at opposing ends of said primary electrical members for measuring the airgap between said primary electrical members and said secondary electrical members with which an associate one with said primary electrical members is operative and generating a data signal, the vehicle further including a plurality of actuators each having a first end pivotably connected to said frame and an opposite second end connected to said vehicle, the actuators responsive to the data signals generated by said air gap sensors for controlling the lateral position of the frame with respect to the vehicle and for controlling the angular orientation of the frame about an axis located between said oppositely located sensors.

20. The transportation system according to claim 19 wherein each of the frames has a centrally located actuator and differential actuators located at each of opposing ends of the frame, the central actuator oriented at an acute angle with respect to the vehicle floor and the end differential actuators oriented generally parallel to the vehicle floor, the central actuator providing for pivoting of the frame between said first and second positions, the central actuator coordinating with said end differential actuators for providing said control of lateral position of the frame, the differential actuators providing for said control of the angular orientation of the frame.

21. A transportation system according to claim 17 wherein said auxiliary dynamoelectric machines further receive excitation power from a current regulator for each of said plurality of primary electrical members thereof, and a master current controller operatively connected to said current regulator for each of said plurality of said electrical members for measuring and controlling an electrodynamic repulsive force acting in addition to a thrust force against the guideway mounted secondary electrical members for enhancing the lateral stability of the vehicle.

22. A transportation system according to claim 17 wherein said secondary electrical members include continuous generally "L" shaped members with two distinct planes forming secondary electrical circuits for induced currents from primary electrical members comprising said auxiliary dynamoelectric machines for electrodynamic propulsion of the vehicle and said dynamoelectric machines for electrodynamically levitating the vehicle.

23. The transportation system according to claim 17 wherein each of said transverse flux motors includes a ferromagnetic core and wherein said secondary electrical members carried by the guideway include ferromagnetic backing material positioned in an offset manner with respect to the ferromagnetic core of the associated transverse primary core, the latter being higher than the former.

24. The transportation system according to claim 23 further including flux return plates embedded in said guideway in a spaced apart and opposing relation to the ferromagnetic backing material of said secondary electrical members, the spaced apart relation being such that the ferromagnetic backing material and the return plate are symmetrical with respect to the center line of the dynamoelectric machine generating fields and magnetic flux for electrodynamically levitating the vehicle.

25. The transportation system according to claim 23 wherein said dynamoelectric machines for generating fields of magnetic flux for electrodynamically levitating include a ferromagnetic return plate sandwiched remote to conductive plates on the guideway, said return plates being offset laterally toward the outside of the guideway with respect to a center line of the dynamoelectric machines for levitating to create a higher lateral restoring force effective for centering the vehicle with respect to the guideway.

26. The transportation system according to claim 23 wherein said electrodynamic machines for levitating each includes a ferromagnetic core and a ferromagnetic return plate sandwiched remote to conductive plates of secondary electrical members on said guideway, the width of the ferromagnetic return plate being not greater than and centered with respect to the width of the ferromagnetic core to eliminate shaded-pole effect and provide symmetrical magnetic flux in the airgap about a center-line of the ferromagnetic core.

27. The transportation system according to claim 17 wherein said electrodynamic machines for levitating each includes a ferromagnetic core and a ferromagnetic return plate sandwiched remote to conductive plates of secondary electrical members on said guideway, the width of the ferromagnetic return plate being not greater than and centered with respect to the width of the ferromagnetic core to eliminate shaded-pole effect and provide symmetrical magnetic flux in the airgap about a center-line of the ferromagnetic core, and wherein said secondary electrical members carried by the guideway each includes a wound field structure for separate excitation by electrical current.

28. The transportation system according to claim 17 wherein said electrodynamic machines for levitating each includes a ferromagnetic core having three excitation coils, and wherein said secondary electrical members include continuous generally "L" shaped members forming secondary open magnetic circuits with induced electrical currents from primary electrical members comprising said auxiliary dynamoelectric machines for electrodynamic propulsion of the vehicle and said dynamoelectric machines for electrodynamically levitating the vehicle.

29. The transportation system according to claim 26 further including flux return plates embedded in said guideway in a spaced apart and opposing relation to the ferromagnetic backing material of said secondary electrical members, the spaced apart relation being such that the ferromagnetic backing material and the return plate are symmetrical with respect to the center line of the dynamoelectric machine generating fields and magnetic flux for electrodynamically levitating the vehicle.

30. The transportation system according to claim 17 wherein each of said transverse flux motors includes a ferromagnetic core and wherein said secondary electrical members carried by the guideway include ferromagnetic backing material positioned in an electromagnetic offset manner with respect to the ferromagnetic core of the associated one of said transverse flux motors, the offset at one side of the dovetail section of the guideway being opposite in sign of the offset at the other side of the guideway, for producing a roll torque and enhancement of roll stability by imposing counteracting forces on the vehicle to compensate centrifugal forces on turns.

31. A transportation system for levitated propulsion of a vehicle relative to a guideway having first sections for linear vehicle travel and second sections for turning movements of the vehicle, the system including:

dynamoelectric machines at each corner of the vehicle responsive to alternating current excitation to generate fields of magnetic flux for electrodynamically levitating, propelling and guiding said vehicle along the first and second sections of the guideway, said dynamoelectric machines at each corner comprising a plurality of AC excited electromagnets laterally offset with respect to adjacent ones of the plurality of electromagnets and independently excited by substantially the same frequency of alternating current, each of the plurality of electromagnets at a corner of the vehicle operating at a predetermined electrical phase difference with respect to adjacent electromagnets such that said plurality of AC excited electromagnetic provide a propulsive force to the vehicle for turning movements in the second sections in addition to levitating and guiding.

32. The transportation system according to claim 31 wherein said second sections of the guideway include at least one track switching area having diverging paths of travel for the vehicle and wherein the transportation system further includes at least one guideway mounted null flux loop responsive to said fields of magnetic flux for laterally guiding the vehicle into one of the diverging paths of travel of the track switching area.

* * * * *